(12) United States Patent
Nepomuceno et al.

(10) Patent No.: US 11,727,495 B1
(45) Date of Patent: *Aug. 15, 2023

(54) COLLISION RISK-BASED ENGAGEMENT AND DISENGAGEMENT OF AUTONOMOUS CONTROL OF A VEHICLE

(71) Applicant: STATE FARM MUTUAL AUTOMOBILE INSURANCE COMPANY, Bloomington, IL (US)

(72) Inventors: John A. Nepomuceno, Bloomington, IL (US); Rajiv C. Shah, Bloomington, IL (US); Leo Nelson Chan, Normal, IL (US); Steven Cielocha, Bloomington, IL (US); Roxane Lyons, Chenoa, IL (US); Matthew S. Megyese, Bloomington, IL (US); William J. Leise, Normal, IL (US); Jennifer Criswell Kellett, Bloomington, IL (US); Kristopher Keith Gaudin, Bloomington, IL (US); Jennifer L. Crawford, Normal, IL (US); Jeremy Myers, Normal, IL (US); Edward P. Matesevac, III, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/064,971

(22) Filed: Oct. 7, 2020

Related U.S. Application Data

(63) Continuation of application No. 15/482,333, filed on Apr. 7, 2017, now Pat. No. 10,872,379.

(Continued)

(51) Int. Cl.
*G06Q 40/08* (2012.01)
*G05D 1/00* (2006.01)
(Continued)

(52) U.S. Cl.
CPC ............. *G06Q 40/08* (2013.01); *B60Q 9/008* (2013.01); *G01C 21/3697* (2013.01);
(Continued)

(58) Field of Classification Search
USPC .......................................................... 705/4
See application file for complete search history.

(56) References Cited

U.S. PATENT DOCUMENTS

| 4,864,298 A | 9/1989 | Dombrowski |
| 5,760,708 A | 6/1998 | Seith |

(Continued)

FOREIGN PATENT DOCUMENTS

| CA | 2967302 C | 4/2019 |
| CA | 2999498 C | 5/2020 |

(Continued)

OTHER PUBLICATIONS

1. Authors et al: Shafin Talukder, SK; Title: Vehicle Collision Detection & Prevention Using Vanet Based IOT With V2V; Submission history From: Wardah Saleh [view email] [v1] Mon, May 16, 2022 17:14:23 UTC (1,046 KB) (Year: 2022).*

(Continued)

*Primary Examiner* — Bruce I Ebersman
*Assistant Examiner* — Hatem M Ali
(74) *Attorney, Agent, or Firm* — Marshall, Gerstein & Borun LLP

(57) ABSTRACT

Systems and methods relate to, inter alia, calculating a collision risk index for an area based upon historical traffic data. The systems and methods may further generate a notification to automatically engage or disengage an autono- (Continued)

mous, or semi-autonomous, vehicle control feature in a vehicle based upon the collision risk index for the area. The systems and methods may further transmit the notification to a device of the vehicle to facilitate automatically engaging or disengaging an autonomous, or semi-autonomous, vehicle control feature in the vehicle as the vehicle approaches the area. As a result, vehicle collisions may be reduced, and vehicle safety enhanced.

15 Claims, 8 Drawing Sheets

Related U.S. Application Data

(60) Provisional application No. 62/402,077, filed on Sep. 30, 2016, provisional application No. 62/340,302, filed on May 23, 2016, provisional application No. 62/321,010, filed on Apr. 11, 2016, provisional application No. 62/321,005, filed on Apr. 11, 2016.

(51) Int. Cl.
  *G05D 1/02* (2020.01)
  *B60Q 9/00* (2006.01)
  *G01C 21/36* (2006.01)
  *G01S 19/13* (2010.01)

(52) U.S. Cl.
  CPC ......... *G05D 1/0061* (2013.01); *G05D 1/0214* (2013.01); *G01S 19/13* (2013.01); *G05D 1/0088* (2013.01); *G05D 1/0236* (2013.01); *G05D 1/0257* (2013.01)

(56) References Cited

U.S. PATENT DOCUMENTS

| | | |
|---|---|---|
| 5,828,299 A | 10/1998 | Chen |
| 5,895,169 A | 4/1999 | Holm et al. |
| 6,161,641 A | 12/2000 | Fukumura et al. |
| 6,632,138 B1 | 10/2003 | Serizawa et al. |
| 6,744,349 B1 | 6/2004 | Asakura et al. |
| 6,922,624 B2 | 7/2005 | Isaji et al. |
| 7,175,227 B2 | 2/2007 | Menard |
| 7,343,306 B1 | 3/2008 | Bates et al. |
| 8,223,010 B2 | 7/2012 | Petite et al. |
| 8,589,033 B2 | 11/2013 | Rafii et al. |
| 8,650,799 B2 | 2/2014 | Chen |
| 8,805,707 B2 | 8/2014 | Schumann, Jr. et al. |
| 8,938,337 B2 | 1/2015 | Nakakura et al. |
| 8,954,340 B2 | 2/2015 | Sanchez et al. |
| 9,020,751 B1 | 4/2015 | Bogovich et al. |
| 9,141,995 B1 | 9/2015 | Brinkmann et al. |
| 9,151,995 B2 | 10/2015 | Tseng et al. |
| 9,159,080 B2 | 10/2015 | Fiorucci et al. |
| 9,248,823 B2 | 2/2016 | MacNeille et al. |
| 9,275,392 B2 | 3/2016 | Potkonjak |
| 9,311,271 B2 | 4/2016 | Wright |
| 9,378,462 B2 | 6/2016 | Davidoff |
| 9,393,961 B1 | 7/2016 | Templeton et al. |
| 9,396,599 B1 | 7/2016 | Malhotra |
| 9,487,139 B1 | 11/2016 | Ishida et al. |
| 9,507,346 B1 | 11/2016 | Levinson et al. |
| 9,514,629 B2 | 12/2016 | Chen et al. |
| 9,558,520 B2 | 1/2017 | Peak et al. |
| 9,587,952 B1 | 3/2017 | Slusar |
| 9,625,266 B1 | 4/2017 | Chintakindi |
| 9,633,487 B2 | 4/2017 | Wright |
| 9,637,965 B1 | 5/2017 | Kothari |
| 9,723,469 B2 | 8/2017 | Truong et al. |
| 9,734,685 B2 | 8/2017 | Fields et al. |
| 9,755,851 B2 | 9/2017 | Grimm et al. |
| 9,762,601 B2 | 9/2017 | Truong et al. |
| 9,816,827 B1 | 11/2017 | Slusar |
| 9,845,048 B1 | 12/2017 | Tseng et al. |
| 10,017,975 B2 | 7/2018 | Broadhead et al. |
| 10,019,904 B1 | 7/2018 | Chan et al. |
| 10,026,309 B1 | 7/2018 | Nepomuceno et al. |
| 10,157,422 B2 | 12/2018 | Jordan Peters et al. |
| 10,161,175 B2 | 12/2018 | Elie et al. |
| 10,192,369 B2 | 1/2019 | Wright |
| 10,198,879 B2 | 2/2019 | Wright |
| 10,204,518 B1 | 2/2019 | Nepomuceno et al. |
| 10,222,228 B1 | 3/2019 | Chan et al. |
| 10,229,645 B2 | 3/2019 | Yamaguchi et al. |
| 10,233,679 B1 | 3/2019 | Chan et al. |
| 10,247,565 B2 | 4/2019 | Nepomuceno et al. |
| 10,282,981 B1 | 5/2019 | Nepomuceno et al. |
| 10,317,907 B2 | 6/2019 | Shami |
| 10,403,150 B1 | 9/2019 | Nepomuceno et al. |
| 10,428,559 B1 | 10/2019 | Nepomuceno et al. |
| 10,431,082 B2 | 10/2019 | Yaldo et al. |
| 10,435,920 B2 | 10/2019 | Ganeshan et al. |
| 10,486,708 B1 | 11/2019 | Chan et al. |
| 10,520,949 B2 | 12/2019 | Hasberg et al. |
| 10,571,283 B1 | 2/2020 | Nepomuceno et al. |
| 10,584,518 B1 | 3/2020 | Chan et al. |
| 10,593,197 B1 | 3/2020 | Nepomuceno et al. |
| 10,635,143 B2 | 4/2020 | Kim et al. |
| 10,641,611 B1 | 5/2020 | Nepomuceno et al. |
| 10,650,677 B2 | 5/2020 | Silver et al. |
| 10,818,113 B1 | 10/2020 | Nepomuceno et al. |
| 2001/0021667 A1 | 9/2001 | Fujimoto et al. |
| 2005/0168331 A1 | 8/2005 | Gunderson |
| 2005/0278098 A1 | 12/2005 | Breed |
| 2006/0006701 A1 | 1/2006 | Wells |
| 2006/0056086 A1 | 3/2006 | Hannah |
| 2006/0200726 A1 | 9/2006 | Gittins et al. |
| 2006/0212344 A1 | 9/2006 | Marcus et al. |
| 2006/0265746 A1 | 11/2006 | Farley et al. |
| 2006/0282270 A1 | 12/2006 | Sheets et al. |
| 2007/0152804 A1 | 7/2007 | Breed et al. |
| 2008/0046150 A1 | 2/2008 | Breed |
| 2008/0074246 A1 | 3/2008 | Isaji et al. |
| 2008/0218381 A1 | 9/2008 | Buckley et al. |
| 2008/0238636 A1 | 10/2008 | Birging et al. |
| 2009/0002141 A1 | 1/2009 | Rinaldi |
| 2009/0027188 A1 | 1/2009 | Saban |
| 2009/0037088 A1 | 2/2009 | Taguchi |
| 2009/0189373 A1 | 7/2009 | Schramm et al. |
| 2009/0204319 A1 | 8/2009 | Shanbhag et al. |
| 2009/0224879 A1 | 9/2009 | Nakazawa et al. |
| 2009/0299547 A1 | 12/2009 | Becker et al. |
| 2009/0322501 A1 | 12/2009 | Haberland |
| 2010/0191584 A1 | 7/2010 | Fraser et al. |
| 2011/0040579 A1 | 2/2011 | Havens |
| 2011/0161116 A1 | 6/2011 | Peak et al. |
| 2011/0213628 A1 | 9/2011 | Peak et al. |
| 2011/0260848 A1 | 10/2011 | Rodriguez Barros et al. |
| 2012/0065858 A1 | 3/2012 | Nickolaou et al. |
| 2012/0096905 A1 | 4/2012 | Yamagata et al. |
| 2012/0100911 A1 | 4/2012 | Rejen |
| 2012/0123806 A1* | 5/2012 | Schumann, Jr. ....... G06Q 40/08 705/4 |
| 2012/0135382 A1 | 5/2012 | Winston et al. |
| 2012/0166229 A1 | 6/2012 | Collins et al. |
| 2012/0194356 A1 | 8/2012 | Haines et al. |
| 2012/0224062 A1 | 9/2012 | Lacoste et al. |
| 2012/0236319 A1 | 9/2012 | Gotou et al. |
| 2012/0296493 A1 | 11/2012 | Wakao |
| 2012/0326889 A1 | 12/2012 | Kabler et al. |
| 2013/0147638 A1 | 6/2013 | Ricci |
| 2013/0169425 A1 | 7/2013 | Victor et al. |
| 2013/0214939 A1 | 8/2013 | Washlow et al. |
| 2013/0219318 A1 | 8/2013 | Schreiber et al. |
| 2013/0265174 A1 | 10/2013 | Scofield et al. |
| 2014/0005907 A1 | 1/2014 | Bajpai |
| 2014/0063248 A1 | 3/2014 | Sakagami et al. |
| 2014/0097957 A1 | 4/2014 | Breed et al. |
| 2014/0118130 A1 | 5/2014 | Chang et al. |
| 2014/0143061 A1 | 5/2014 | Abhyanker |
| 2014/0177911 A1 | 6/2014 | Heisele |
| 2014/0276090 A1 | 9/2014 | Breed |

(56) References Cited

U.S. PATENT DOCUMENTS

| | | |
|---|---|---|
| 2014/0309849 A1 | 10/2014 | Ricci |
| 2014/0309855 A1 | 10/2014 | Tran |
| 2014/0310186 A1 | 10/2014 | Ricci |
| 2014/0350970 A1 | 11/2014 | Schumann, Jr. et al. |
| 2015/0062168 A1 | 3/2015 | Ng-Thow-Hing et al. |
| 2015/0070136 A1 | 3/2015 | Kameyama et al. |
| 2015/0104071 A1 | 4/2015 | Martin et al. |
| 2015/0106010 A1 | 4/2015 | Martin et al. |
| 2015/0166072 A1 | 6/2015 | Powers et al. |
| 2015/0179067 A1 | 6/2015 | Thun et al. |
| 2015/0192660 A1 | 7/2015 | Dickow et al. |
| 2015/0197248 A1 | 7/2015 | Breed et al. |
| 2015/0198951 A1 | 7/2015 | Thor et al. |
| 2015/0203035 A1 | 7/2015 | Watanabe |
| 2015/0294431 A1 | 10/2015 | Fiorucci et al. |
| 2016/0001781 A1 | 1/2016 | Fung et al. |
| 2016/0002959 A1 | 1/2016 | Javadzadeh et al. |
| 2016/0006922 A1 | 1/2016 | Boudreau et al. |
| 2016/0009252 A1 | 1/2016 | Jeong |
| 2016/0050315 A1 | 2/2016 | Malhotra et al. |
| 2016/0068156 A1 | 3/2016 | Horii |
| 2016/0071418 A1 | 3/2016 | Oshida et al. |
| 2016/0093212 A1 | 3/2016 | Barfield, Jr. et al. |
| 2016/0144841 A1 | 5/2016 | White |
| 2016/0163217 A1 | 6/2016 | Harkness |
| 2016/0189303 A1 | 6/2016 | Fuchs |
| 2016/0207540 A1 | 7/2016 | Liu et al. |
| 2016/0259341 A1 | 9/2016 | High et al. |
| 2016/0297362 A1 | 10/2016 | Tijerina et al. |
| 2016/0358477 A1 | 12/2016 | Ansari |
| 2016/0362118 A1 | 12/2016 | Mollicone et al. |
| 2016/0373473 A1 | 12/2016 | Truong et al. |
| 2016/0375883 A1 | 12/2016 | Harrer |
| 2017/0028907 A1 | 2/2017 | Chen |
| 2017/0032673 A1 | 2/2017 | Scofield et al. |
| 2017/0039850 A1 * | 2/2017 | Vanden Berg ........... B60Q 9/00 |
| 2017/0132914 A1 | 5/2017 | Dannat et al. |
| 2017/0138108 A1 | 5/2017 | Kothari |
| 2017/0161614 A1 | 6/2017 | Mehta et al. |
| 2017/0169703 A1 | 6/2017 | Carrasco et al. |
| 2017/0174221 A1 | 6/2017 | Vaughn et al. |
| 2017/0218678 A1 | 8/2017 | Kothari |
| 2017/0228604 A1 | 8/2017 | Ferguson et al. |
| 2017/0235305 A1 | 8/2017 | Jung et al. |
| 2017/0236416 A1 | 8/2017 | Dannat et al. |
| 2017/0241791 A1 | 8/2017 | Madigan et al. |
| 2017/0305421 A1 | 10/2017 | Sekizawa et al. |
| 2017/0334459 A1 | 11/2017 | McNew |
| 2017/0371339 A1 | 12/2017 | Charette et al. |
| 2018/0001890 A1 | 1/2018 | Ratcliffe |
| 2018/0032071 A1 | 2/2018 | Wieneke |
| 2018/0032891 A1 | 2/2018 | Ba et al. |
| 2018/0072271 A1 | 3/2018 | Yiwei et al. |
| 2018/0079359 A1 | 3/2018 | Park et al. |
| 2018/0081357 A1 | 3/2018 | Datta Gupta et al. |
| 2018/0118209 A1 | 5/2018 | Suzuki et al. |
| 2018/0150079 A1 | 5/2018 | Isozaki |
| 2018/0233047 A1 | 8/2018 | Mandeville-Clarke |
| 2018/0233048 A1 | 8/2018 | Bemler et al. |
| 2018/0264894 A1 | 9/2018 | Goto et al. |
| 2018/0304898 A1 | 10/2018 | Yoshikawa et al. |
| 2019/0176737 A1 | 6/2019 | Watanabe |
| 2019/0211587 A1 | 7/2019 | Ganeshan et al. |
| 2019/0259283 A1 | 8/2019 | Sung et al. |

FOREIGN PATENT DOCUMENTS

| | | | |
|---|---|---|---|
| CN | 101609606 A | 12/2009 | |
| CN | 103413441 A | 11/2013 | |
| CN | 103413441 B | 12/2015 | |
| DE | 102017122432 A1 | 3/2019 | |
| JP | 2004046426 A | 2/2004 | |
| WO | WO-03/093857 A2 | 11/2003 | |
| WO | WO-2014192369 A1 | 12/2014 | |
| WO | WO-2016110999 A1 * | 7/2016 | ............... G08G 1/16 |
| WO | WO-2017207154 A1 | 12/2017 | |
| WO | WO-2018128946 A1 | 7/2018 | |

OTHER PUBLICATIONS

2. Authors et al: Catherine Phillip; Title: Vehicle Detection and Collision Avoidance System; Date of Conference: Mar. 25-26, 2022 Date Added to IEEE Xplore: Jun. 7, 2022 (Year: 2022).*

1. Authors et al: Shafin Talukder, SK; Title: Vehicle Collision Detection & Prevention Using Vanet Based IOT With V2V; Submission history From: Wardah Saleh [view email] [v1] Mon, May 16, 2022 17:14:23 UTC (1,046 KB) (Year: 2022) (Year: 2022).*

2. Authors et al: Catherine Phillip; Title: Vehicle Detection and Collision Avoidance System; Date of Conference: Mar. 25-26, 2022 Date Added to IEEE Xplore: Jun. 7, 2022 (Year: 2022) (Year: 2022).*

An Introduction to the Highway Safety Manual, American Association of State Highway and Transportation Officials, downloaded from the Internet at <http://www.highwaysafetymanual.org/Pages/default.aspx> (made publicly available before Apr. 2017).

Donlon, "Hyundai Debuts New Safe Exit Assist System to Keep Passengers from Opening Car Doors Too Soon", Engineering 360, Jul. 11, 2018; 2 pages. Year: 2018).

Fingas, Waze warns you about dangerous intersections in big US cities, downloaded from the Internet at: <https://www.engadget.com/2016/03/23/waze-warns-about-dangerous-intersections/> (Mar. 23, 2016).

Highway Performance Monitoring System Traffic Data for High Volume Routes: Best Practices and Guidelines Final Report (Sep. 8, 2004).

Lee et al., A VDS Based Traffic Accident Prediction Analysis and Future Application, IN: Nguyen et al. (eds.), Agent and Multi-Agent Systems: Technologies and Applications. KES-AMSTA 2007. Lecture Notes in Computer Science, vol. 4496, Springer, Berlin (2007).

Map of Detroit—Claims at Intersections (May 2018).

Naji et al., Shortcomings in Road Accident Data in Developing Countries, Identification and Correction: A Case Study, IATSS Research, 24(2):66-74 (2000).

Roadway Information Database (RID), Iowa State University, Center for Transportation Research and Education, downloaded from the Internet at: <http://www.ctre.iastate.edu/shrp2-rid/rid.cfm> (2014).

Sayed et al., Evaluating the Safety Benefits of the Insurance Corporation of British Columbia Road Improvement Program using a Full Bayes Approach, Transportation Research Board 2016 Annual Meeting (Nov. 15, 2015).

Shah, Accident Heat Map for Chicago (2015).

Wilkinson et al., The History of the Cluster Heat Map, The American Statistician, 63(2):179-84 (May 2009).

Worley, Road Traffic Accidents Increase Dramatically Worldwide, Popular Reference Bureau, Mar. 1, 2006.

* cited by examiner

COLLISION RISK-BASED ENGAGEMENT AND DISENGAGEMENT OF AUTONOMOUS CONTROL OF A VEHICLE

CROSS REFERENCE TO RELATED APPLICATIONS

This application is a continuation of U.S. patent application Ser. No. 15/482,333 entitled "Collision Risk-Based Engagement and Disengagement of Autonomous Control of a Vehicle" and filed Apr. 7, 2017, which claims the benefit of U.S. Provisional Patent Application No. 62/321,005, entitled "Device for Detecting and Visualizing High-Risk Intersections and Other Areas" filed on Apr. 11, 2016, U.S. Provisional Patent Application No. 62/321,010, entitled "Analyzing Auto Claim and Vehicle Collision Data to Identify Hazardous Areas and Reduce Vehicle Collisions" filed on Apr. 11, 2016, U.S. Provisional Patent Application No. 62/340,302, entitled "Analyzing Auto Claim and Vehicle Collision Data to Identify Hazardous Areas and Reduce Vehicle Collisions" filed on May 23, 2016, and U.S. Provisional Patent Application No. 62/402,077, entitled "Collision Risk-Based Engagement and Disengagement of Autonomous Control of a Vehicle" filed Sep. 30, 2016, all of which are hereby incorporated herein by reference in their entirety.

TECHNICAL FIELD

The present disclosure relates generally to reducing vehicle collisions. More particularly, the present disclosure relates to automatically engaging or disengaging an autonomous vehicle control feature in hazardous areas, thereby reducing future vehicle collisions and personal risk.

BACKGROUND

Drivers and passengers assume a certain degree of risk of injury or property damage when travelling by vehicle. This risk may be mitigated by reducing or eliminating certain contributing factors. For example, a driver may avoid risky behavior, such as driving while intoxicated, driving while tired, or driving while texting. As another example, a driver may mitigate the risk of serious injury by driving a car with safety features such as airbags, seatbelts, and antilock brakes.

However, certain risk factors may not be mitigated. For example, the very nature of a vehicle may present certain inherent risks. A typical car may weigh thousands of pounds and may not always maneuver or stop quickly. When travelling at even a moderate speed, a collision may result in serious damage to the vehicle and serious injury to the occupants. Further, a driver or passenger of a vehicle may have no control over perhaps the greatest risk factor involved with driving: other drivers or passengers in other vehicles.

In some situations, environmental factors may contribute to the relative riskiness or safety of an area. For example, a driver approaching a one-lane bridge in a valley between two hills may not see the bridge until the vehicle has crested the hill. If the distance between the hill crest and the bridge is short, the driver may have little time to react if a second driver is approaching the bridge from the other direction. A driver may have little to no control over these environmental factors.

Moreover, environmental factors contributing to the riskiness of an area may not always be readily apparent, observable, or quantifiable. For example, even if a civil engineer identifies a number of one-lane bridges as potentially dangerous, she may have no way of quantifying how risky these one-lane bridges are relative to one another. Additionally, the engineer may overlook a two-lane bridge that is seemingly safe, but which is in actuality riskier than many of the identified one-lane bridges. Because the environmental factors contributing to risk may not always be apparent, observable, or quantifiable, these environmental risk factors may go unnoticed. Thus, engineers and government officials may never identify certain high-risk areas, much less identify solutions to mitigate the risk and improve the safety of the areas for vehicle drivers and passengers.

Further, in some situations, a driver or passenger may be exposed to high risk traffic situations, particularly when relying on recommended routes from a navigation application or navigator when travelling through unfamiliar places. The routes may pass through hazardous areas, such as high risk intersections, road segments or portions of certain roads, abnormal traffic patterns, exit ramps, circular traffic flows, road construction areas, and parking lots susceptible to theft, exposing the driver or passenger to the risk of property damage, injury, time delay stemming from accidents, and the likes.

BRIEF SUMMARY

The present embodiments disclose systems and methods that may generally relate to reducing vehicle collisions, and particularly, inter alia, automatically engaging or disengaging autonomous vehicle control features of a vehicle in areas, such as hazardous areas, that are prone to vehicle collisions.

Hazardous areas (e.g., high risk intersections, road segments or portions of certain roads, bridges, abnormal traffic patterns, seasonal increases in animal crossings, the presence of inclement weather and its resultant effects on road surface and/or visibility conditions, exit ramps, circular traffic flows, road construction areas, parking lots, and other transportation infrastructure) are prone to induce, or be associated with, vehicle collisions. One way to measure how hazardous an area is by calculating a collision risk index for the area, which quantifies how prone the area is to vehicle collisions. When collision risk indices are calculated for more than one area, the collision risk indices may be compared to one another to enable a comparison of the relative riskiness of several areas.

Calculating the collision risk index may include any one or more of: (i) calculating a number of expected collisions in an area over a time period; (ii) determining a number of observed collisions in the area over the time period; and (iii) calculating the collision risk index based upon a comparison between the number of expected collisions and the number of observed collisions. The number of expected and observed collisions may be calculated based upon (a) historical traffic data for the area, and/or (b) historical traffic data for multiple areas, such that the number of expected and observed collisions may correspond to the collision risk index for the area and/or collision risk indices for multiple areas (e.g., mean, median, or mode of the collision risk indices). Examples of historical traffic data include historical auto insurance claim data and/or other data, such as vehicle collision data, mobile device data, telematics data, vehicle mounted-sensor data, autonomous vehicle sensor data, smart infrastructure sensor data, and image data. The number of expected collisions may be a function of traffic volume or flow, and may be further adjusted for market penetration.

The number of observed collisions may be limited to observations involving vehicles within the market corresponding to the market penetration.

Subsequent to calculating the collision risk index, the systems and methods may facilitate automatically engaging or disengaging an autonomous vehicle control feature in a vehicle as the vehicle approaches an area, such as a hazardous area. Examples of an autonomous vehicle control feature include autonomous steering control, autonomous braking control, autonomous throttle control, and the likes.

In some embodiments, the systems and methods may generate a notification to automatically engage or disengage the autonomous vehicle control feature based upon the collision risk index or based upon an aggregate collision risk index over a travel route. In some embodiments, the systems and methods may further include determining that the collision risk index for an area, or the aggregated collision risk index over a specified route, exceeds a predetermined threshold. The predetermined threshold may be defined as a set of parameters that describe traffic, environment, and vehicle operating conditions that exceed the acceptable tolerances and limits of the autonomous driving system's capabilities. If the collision risk index for the area, or the aggregated collision risk index over a specified route, exceeds a predetermined threshold, the area or route may be classified as hazardous. Such a determination may be used as a criteria for generating the notification to automatically engage or disengage the autonomous vehicle control feature for a vehicle that approaches the hazardous area or specified route having a collision risk index exceeding the predetermined threshold. If the collision risk index for the area does not exceed the predetermined threshold, the area may not be classified as hazardous, and generation of such a notification may be unnecessary. In some embodiments, the generation of the notification may further be based upon whether the autonomous vehicle control feature was engaged or disengaged in the vehicle or other vehicles in the area based upon historical traffic data.

The systems and methods may further transmit the notification to an electronic device (e.g., mobile device, an on-board computer, wearable electronics including an augmented reality appliance, or a navigator) associated with a vehicle, operator or passenger of a vehicle, pedestrian, bicyclist, and the likes to facilitate automatically engaging or disengaging the autonomous vehicle control feature in the vehicle based upon the collision risk index or based upon a lower aggregate risk for a specified route, via wireless communication or data transmission over one or more radio links or wireless communication channels. The electronic devices may receive such notifications when approaching the area, such as the hazardous area (e.g., an area having a collision risk index exceeding a predetermined threshold) for instance. The notification may not only prompt for the engagement or disengagement of an autonomous vehicle control feature at the electronic device of the vehicle, but may also indicate that potentially hazardous traffic conditions such as merging traffic, abnormal traffic flow, reduced number of lanes (e.g., 3 lanes being condensed to 2 lanes), road construction, and suboptimal road surface resulting from inclement weather conditions are on the route ahead. Such hazardous areas may be depicted on a virtual navigation map or via an audible, visual, or haptic alert, and may also be depicted with their corresponding collision risk index. The virtual navigation map may include graphic elements depicting collision risk indices for one or more areas. The virtual navigation map may be in the form of a heat map. The systems and methods may include additional, less, or alternate functionality, including that discussed elsewhere herein.

In some embodiments, a computer system may include a processor and one or more memory devices storing non-transitory computer readable instructions that when executed cause the processor to calculate a collision risk index. The instructions may cause the processor to do any one or more of the following: (i) calculating a number of expected collisions in an area over a time period; (ii) determining a number of observed collisions in the area over the time period; and (iii) calculating the collision risk index based upon a comparison between the number of expected collisions and the number of observed collisions. The number of expected and observed collisions may be calculated based upon (a) historical traffic data for the area, and/or (b) historical traffic data for multiple areas, such that the number of expected and observed collisions may correspond to the collision risk index for the area and/or collision risk indices for multiple areas (e.g., mean, median, or mode of the collision risk indices). The number of expected collisions may be a function of traffic flow, and/or adjusted for market penetration. The number of observed collisions may be limited to observations involving vehicles within the market corresponding to the market penetration.

In some embodiments, the instructions may further cause the processor to facilitate automatically engaging or disengaging an autonomous vehicle control feature in a vehicle as the vehicle approaches an area, such as a hazardous area. In some embodiments, the instructions may further cause to processor to generate a notification to automatically engage or disengage an autonomous vehicle control feature based upon the collision risk index. In some embodiments, the instructions may further cause the processor to determine that the collision risk index for an area or that the aggregate collision risk index for a specified route exceeds a predetermined threshold. If the collision risk index for the area exceeds a predetermined threshold, the area may be classified as hazardous. Such a determination may be used as a criteria for generating the notification to automatically engage or disengage the autonomous vehicle control feature for a vehicle that approaches the hazardous area having a collision risk index exceeding the predetermined threshold. If the collision risk index for the area does not exceed the predetermined threshold, the area may not be classified as hazardous, and generation of such a notification may be unnecessary. In some embodiments, the instructions may further cause the processor to generate a notification to automatically engage or disengage an autonomous vehicle control feature based upon whether the autonomous vehicle control feature was engaged or disengaged in the vehicle or other vehicles in the area based upon historical traffic data.

In some embodiments, the instructions may further cause a transceiver to transmit the notification to an electronic device (e.g., mobile device, an on-board computer, wearable electronics including an augmented reality appliance, and a navigator) associated with a vehicle, operator or passenger of a vehicle, pedestrian, bicyclist, and the likes to facilitate automatically engaging or disengaging the autonomous vehicle control feature in the vehicle, via wireless communication or data transmission over one or more radio links or wireless communication channels. The electronic devices may receive such notifications when approaching the area, such as the hazardous area (e.g., an area having a collision risk index exceeding a predetermined threshold) for instance. The notification may not only prompt for the engagement or disengagement of an autonomous vehicle control feature at the electronic device of the vehicle, but may also indicate that hazardous areas such as merging traffic, abnormal traffic flow, reduced number of lanes (e.g., 3 lanes being condensed to 2 lanes), road construction are approaching. Such hazardous areas may be depicted on a virtual navigation map or via an audible, visual, or haptic alert, and may also be depicted with their corresponding collision risk index. The virtual navigation map may include graphic elements depicting collision risk indices for one or more areas. The virtual navigation map may be in the form of a heat map. The systems and methods may include additional, less, or alternate functionality, including that discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

The present embodiments may generally relate to reducing vehicle collisions, and particularly, inter alia, to automatically engaging or disengaging autonomous (or semi-autonomous) vehicle control features of a vehicle in areas, such as hazardous areas, that are prone to vehicle collisions.

Hazardous areas (e.g., high risk intersections, road segments or portions of certain roads, bridges, abnormal traffic patterns, exit ramps, circular traffic flows, road construction areas, parking lots, and other transportation infrastructure) are prone to induce, or be associated with, vehicle collisions. One way to measure how hazardous an area is by calculating a collision risk index for the area, which quantifies how prone the area is to vehicle collisions. Calculating the collision risk index may include various methods and/or factors, including those discussed elsewhere herein. Subsequent to calculating the collision risk index, an autonomous (or semi-autonomous) vehicle control feature in a vehicle may be automatically engaged or disengaged based upon the collision risk index or based upon the aggregate collision risk index.

Figure 1:
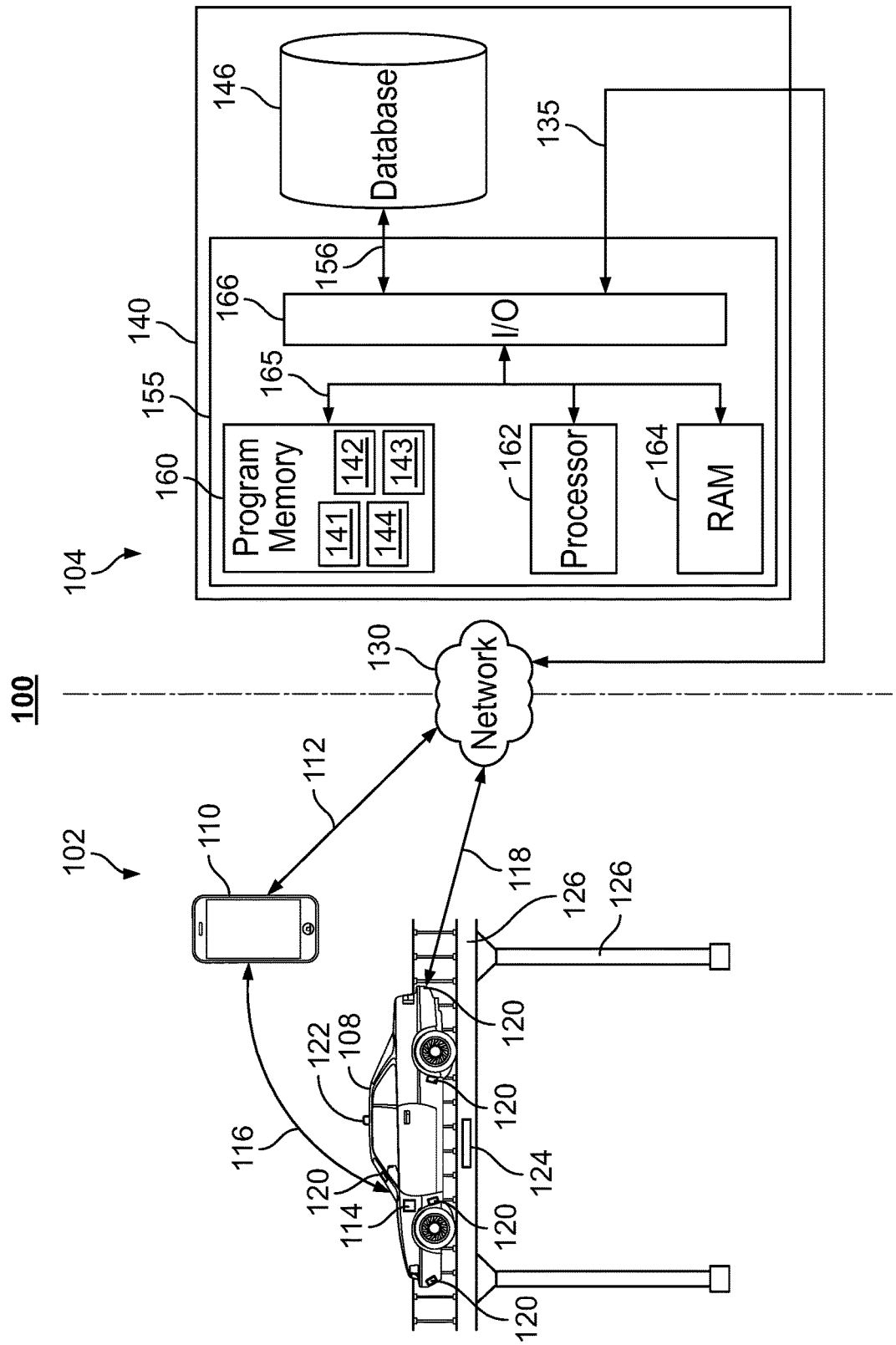
FIG. 1 illustrates a block diagram of an exemplary interconnected wireless communication system 100 on which the methods described herein may be implemented.

FIG. 1 illustrates a block diagram of an interconnected wireless communication system 100 on which the methods described herein may be implemented. The communication system 100 may generally be divided into front-end components 102 and back-end components 104, both of which may include hardware and software applications, as well as various data communications channels for communicating data between the various hardware and software components. The front-end components 102 may generate or collect historical traffic data from mobile device-mounted sensors, vehicle-mounted sensors, smart infrastructure-mounted sensors, wearable electronics-mounted sensors, or other sensors. The historical traffic data may be in the form of vehicle data, vehicle collision data, geographic location data (e.g., GPS data), telematics data, mobile device data, vehicle-mounted sensor data, auto insurance claim data, autonomous vehicle data, smart infrastructure sensor data, image data, or other data. Historical traffic data may provide contextual information of the vehicle 108 (e.g., a car such as an autonomous or semi-autonomous car, truck, motorcycle, bicycle), pedestrian, bicyclist, and the likes, related to traffic, vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment (e.g., construction, accidents in the area, weather, road condition), or other information relating to use of the vehicle 108. Historical traffic data may be collected before, during, and/or after vehicle collisions.

Front-end components 102 may include on-board computer 114, mobile device 110 (e.g., a smart phone, a cellular phone, a tablet computer, a special purpose or general use computing device, smart watch, wearable electronics such as augmented reality appliances, vehicle navigation device, dedicated vehicle monitoring or control device, and the likes), one or more sensors 120 associated with vehicle 108, and a communication component 122. The on-board computer 114 may be a general-use on-board computer capable of performing many functions relating to vehicle operation or a dedicated computer for autonomous vehicle operation. Further, the on-board computer 114 may be originally installed by the manufacturer of the vehicle 108, or installed as an aftermarket modification or addition to the vehicle 108. Examples of sensors 120 include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. The sensors 120 may also be removably or fixedly incorporated within or connected to the on-board computer 114 or the mobile device 110 and may be disposed in various arrangements.

The on-board computer 114 or mobile device 110 may each be configured to execute one or more algorithms, programs, or applications to generate, collect, or analyze various types of historical traffic data from one or more sensors 120 mounted or installed within the vehicle 108. For instance, if vehicle 108 is an autonomous vehicle, the on-board computer 114 may collect data related to the autonomous vehicle control features to assist the vehicle operator in operating the vehicle 108. The on-board computer 114 or mobile device 110 may further process the historical traffic data to calculate a collision risk index for an area. In such embodiments, the on-board computer 114 or mobile device 110 may process the historical traffic data to automatically engage or disengage an autonomous (or semi-autonomous) vehicle control feature in a vehicle based upon the collision risk index, and may further generate a virtual navigation map or an alert depicting the area to display on the mobile device 110 or on-board computer 114 or take other actions.

The on-board computer 114 or mobile device 110 may utilize one or more applications or routines to automatically engage or disengage an autonomous (or semi-autonomous) vehicle control feature in a vehicle based upon the collision risk index. For instance, one or more applications may generate or implement control commands to actually control vehicle control components, such as components that control the steering, braking, or throttling of the vehicle 108, based upon the collision risk index. To facilitate such control, the on-board computer 114 or mobile device 110 may be communicatively connected to vehicle control components of the vehicle 108 by various electrical or electro-mechanical connections. When a control command is generated by the on-board computer 114 or mobile device 110, it may thus be communicated to the vehicle control components of the vehicle 108 to effect a control action. In embodiments involving fully autonomous vehicles, the vehicle 108 may be operable only through such vehicle control components. In other embodiments, the vehicle control components may be disposed within or supplement other vehicle operator control components, such as steering wheels, accelerator or brake pedals, or ignition switches.

One or more of the applications or routines may generate and/or display a user notification indicating whether to automatically engage or disengage a particular autonomous vehicle control feature, and allow the user to accept or decline engagement or disengagement of the particular autonomous vehicle control feature. The one or more of the applications may also allow a user to configure the operating parameters of an autonomous vehicle control feature. For example, a user may desire certain autonomous vehicle control features to never automatically engage or disengage, certain autonomous vehicle control features to always automatically engage or disengage, certain autonomous vehicle control features to always automatically engage and never automatically disengage, certain autonomous vehicle control features to never automatically engage and always automatically disengage, and the likes. Such applications may store user preferences, such as in a user profile, in the memory of on-board computer 114 or mobile device 110.

In some embodiments, the mobile device 110 may supplement the functions performed by the on-board computer 114 described herein. In other embodiments, the on-board computer 114 may perform all of the functions of the mobile device 110 described herein, in which case no mobile device 110 may be present in the system 100. Additionally, the mobile device 110 and on-board computer 114 may communicate with one another directly over link 116 or indirectly over multiple radio links.

The on-board computer 114 or mobile device 110 may also be configured to communicate with the vehicle 108 utilizing a Bluetooth communication protocol, for instance. In some embodiments, the on-board computer 114 or mobile device 110 may communicate with vehicle 108, such as via a vehicle controller (not shown), or a vehicle telephony, entertainment, navigation, or information system (not shown) of the vehicle 108 that provides functionality other than autonomous (or semi-autonomous) vehicle control.

The communication component 122 may be utilized to transmit and receive information from external sources, including other vehicles, infrastructure, smart home controllers or sensors, or the back-end components 104. To send and receive information, the communication component 122 may include a transmitter and a receiver (or transceiver) designed to operate according to predetermined specifications, such as the dedicated short-range communication (DSRC) channel, wireless telephony, Wi-Fi, or other existing or later-developed communications protocols. The received information may supplement the data received from the sensors 120. For example, the communication component 122 may receive information that another vehicle ahead of the vehicle 108 is reducing speed, allowing for adjustments in the operation of the vehicle 108. As another example, the communication component 122 may receive information that another vehicle ahead of the vehicle 108 engaged or disengaged an autonomous (or semi-autonomous) vehicle control feature, allowing for adjustments in the engaging or disengaging an autonomous (or semi-autonomous) vehicle control feature at the vehicle 108.

In some embodiments, the front-end components 102 may communicate with the back-end components 104, such as the server 140, via a network 130. As such, the back-end components 104 may receive historical traffic data that was collected by the front-end components 102. The on-board computer 114 and mobile device 110 may be configured to send historical traffic data to and/or receive data from network 130 using one or more suitable communication protocols, such as a Wi-Fi direct protocol, an ad-hoc cellular communication protocol, and the likes. Network 130 may be a proprietary network, a secure public internet, a virtual private network or some other type of network, such as dedicated access lines, plain ordinary telephone lines, satellite links, cellular data networks, or a combination thereof. Network 130 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 130 may include one or more radio frequency communication links, such as wireless communication links 112 and 118 with the mobile device 110 and on-board computer 114, respectively. Where the network 130 comprises the Internet, data communications may take place over the network 130 via an Internet communication protocol.

In further embodiments, the front-end components 102 may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting and receiving information relating to the condition of the infrastructure component 126, such as weather conditions, traffic conditions, or operating conditions of the infrastructure component 126. The infrastructure communication device 124 may further be configured to communicate the received information to vehicle 108 via the communication component 122. In some embodiments, the infrastructure communication device 124 may receive information from the vehicle 108, while, in other embodiments, the infrastructure communication device 124 may only transmit information to the vehicle 108. The infrastructure communication device 124 may be configured to monitor the vehicle 108 and/or directly or indirectly communicate information to other vehicles.

Server 140 may receive or collect historical traffic data from the front-end components 102 via the network 130, store the received historical traffic data in database 146 or program memory 160, process the received historical traffic data (e.g., calculate the collision risk index based upon the historical traffic data), and/or communicate information associated with the received or processed historical traffic data back to the front-end components 102. Further, the server 140 may access data stored in database 146 when classifying or identifying high risk or hazardous areas, execute various functions and tasks associated with transmitting a notification to the front end components 102 to facilitate automatically engaging or disengaging an autonomous vehicle control feature in the vehicle 108 as the vehicle 108 approaches or is already traversing an area, such as a hazardous area, or generating a virtual navigation map depicting the hazardous area or alerts of approaching hazardous areas.

The server 140 may comprise a controller 155 that is operatively connected to the database 146 via a link 156. The controller 155 may also be operatively connected to the network 130 via a link 135. The controller 155 may include a program memory 160, a processor 162, a random-access memory (RAM) 164, and an input/output (I/O) circuit 166, all of which may be interconnected via an address/data bus 165. Similarly, the memory of the controller 155 may include multiple RAMs 164 and multiple program memories 160. The RAM 164 and program memory 160 may be implemented as semiconductor memories, magnetically readable memories, or optically readable memories, for example. The program memory 160 may store various software applications, which may include an autonomous operation information monitoring application 141, a feature evaluation application 142, a collision risk index mapping application 143, and an autonomous (or semi-autonomous) vehicle control feature engage/disengage application 144.

The autonomous operation information monitoring application 141 may be configured to receive information regarding autonomous vehicle control features (which may include control commands for actually controlling various vehicle control features) to be informed of the capabilities at vehicle 108. The feature evaluation application 142 may be configured to determine the effectiveness of autonomous vehicle control features under various conditions based on tracking the historical traffic data. For example, the feature evaluation application 142 may determine from tracking the historical traffic data that disengaging certain autonomous vehicle control features when roads are slippery correlated to lower collision risk indices. The autonomous vehicle control feature engage/disengage application 144 may generate a notification for transmission to the front end components 102 to facilitate automatically engaging or disengaging an autonomous vehicle control feature in the vehicle 108 as the vehicle 108 approaches an area, such as a hazardous area, based upon the collision risk index. For example, the autonomous vehicle control feature engage/disengage application 144 may access the feature evaluation application 142 to generate a notification for transmission to the front end components 102 to facilitate automatically disengaging certain autonomous vehicle control features when roads are slippery. Optionally, generation of the notification may further be based upon whether the autonomous vehicle control feature was engaged or disengaged in the vehicle or other vehicles in the area based upon historical traffic data.

The collision risk index mapping application 143 may determine and electronically map an area having a collision risk index onto a virtual navigation map or an alert. The virtual navigation map or alert may be included in the notification that is transmitted to the front end components 102. The collision risk index mapping application 143, the feature evaluation application 142, and the autonomous vehicle control feature engage/disengage application 144 may have access to the collision risk index calculated by processor 162. The various software applications may be executed by the same computer processor 162 or by different computer processors.

In some embodiments, one or more portions of the server 140 may be implemented as one or more storage devices that are physically co-located with server 140, or as one or more storage devices utilizing different storage locations as a shared database structure (e.g. cloud storage). In some embodiments, server 140 may be configured to perform any suitable portion of the processing functions remotely that have been outsourced by mobile device 110 or the on-board computer 114. For example, mobile device 110 may collect historical traffic data as described herein, but may send the historical traffic data to server 140 for remote processing by the server 140 instead of processing the historical traffic data locally. In such embodiments, server 140 may receive and process the historical traffic data to generate the notification to automatically engage or disengage an autonomous vehicle control feature for a vehicle that approaches an area having a collision risk index, and may further generate and/or transmit a virtual navigation map or an alert depicting the area to the mobile device 110 or on-board computer 114 or take other actions.

In some embodiments, the server 140 may be part of an insurer computing system (or facilitate communications with an insurer computer system), and as such, may access insurer databases as needed to perform insurance-related functions. Accordingly, data received from mobile device 110 or on-board computer 114 may include user credentials, which may be verified by server 140 or one or more other external computing devices or servers. These user credentials may be associated with an insurance profile, which may include, for example, financial account information, insurance policy numbers, a description and/or listing of insured assets, vehicle identification numbers of insured vehicles, addresses of insured users, contact information, premium rates, discounts, and the likes. In this way, data received from mobile device 110 or on-board computer 114 may allow server 140 to uniquely identify each insured customer. In addition, server 140 may facilitate the communication of the updated insurance policies, premiums, rates, discounts, and the likes to their insurance customers for their review, modification, and/or approval.

Although the system 100 is shown to include one vehicle 108, one mobile device 110, one on-board computer 114, and one server 140, it should be understood that additional vehicles 108, mobile devices 110, on-board computers 114, and/or servers 140 may be utilized. For example, the system 100 may include a plurality of servers 140 and hundreds of mobile devices 110 or on-board computers 114, all of which may be interconnected via the network 130. For example, servers 140 may be dedicated for each of the various types of historical traffic data described above. Furthermore, the database storage or processing performed by the one or more servers 140 may be distributed among a plurality of servers 140 in a cloud computing arrangement. This configuration may provide various advantages, such as enabling near real-time uploads and downloads of information, as well as periodic uploads and downloads of information. This may in turn support a thin-client embodiment of the mobile device 110 or on-board computer 114 discussed herein.

Figure 2:
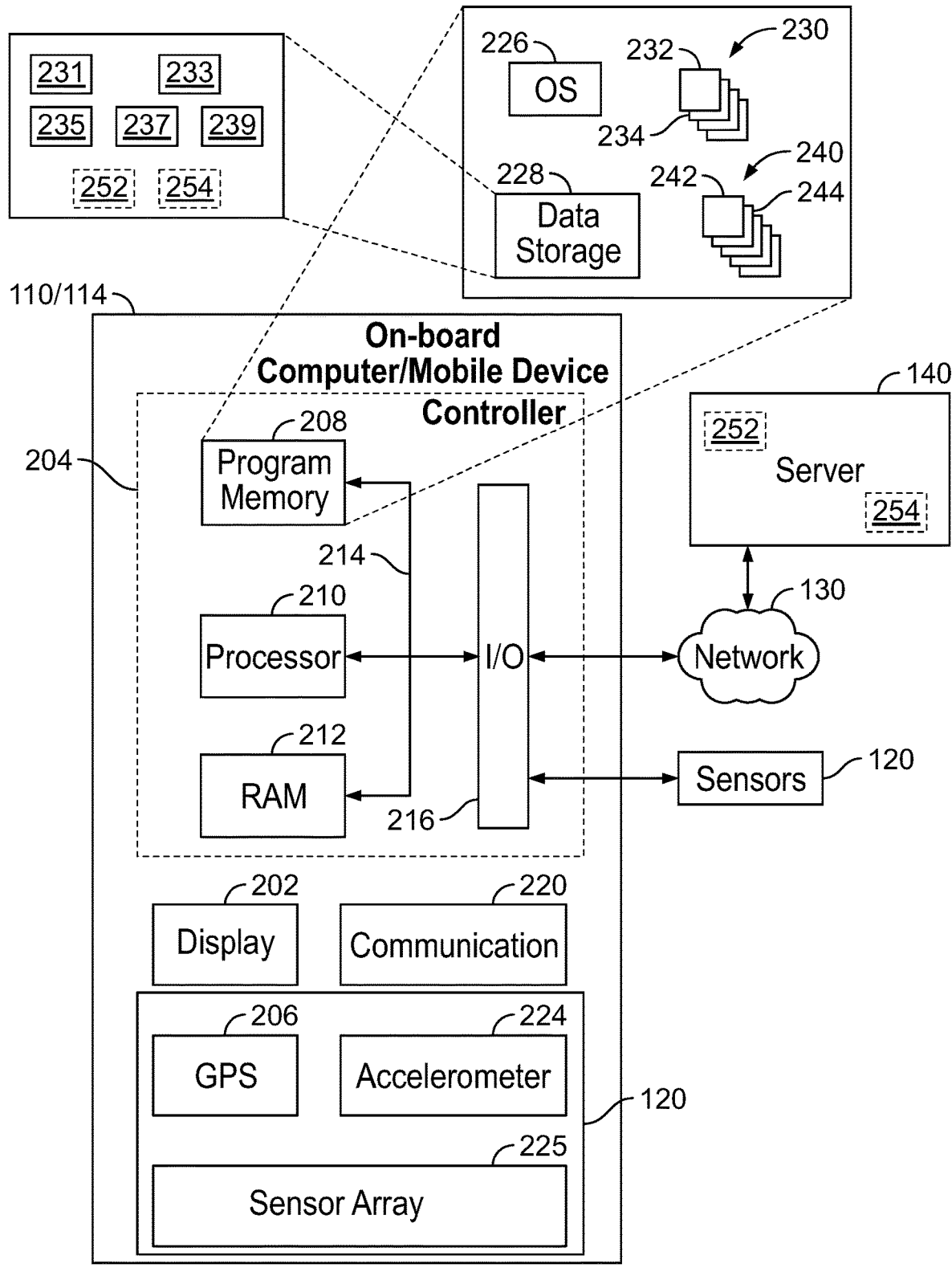
FIG. 2 illustrates a block diagram of an exemplary on-board computer or mobile device according to one embodiment.

FIG. 2 illustrates a block diagram of a system 200 including mobile device 110 or an on-board computer 114 and server 140 consistent with the system 100 of FIG. 1. The mobile device 110 or on-board computer 114 may include a display 202, a controller 204, a GPS unit 206, a communication unit 220, an accelerometer 224, a sensor array 225 (e.g., one or more cameras, accelerometers, gyroscopes, magnetometers, barometers, thermometers, proximity sensors, light sensors, Hall Effect sensors, radar units) and one or more user-input devices (not shown), such as a keyboard, mouse, microphone, or any other suitable user-input device. The communication unit 220 may provide input signals to the controller 204 via the I/O circuit 216, and may also transmit sensor data, device status information, control signals, or other output from the controller 204 to one or more external sensors within the vehicle 108 or server 140. The one or more sensors of the sensor array 225 may be positioned to determine telematics data regarding the speed, force, heading, and/or direction associated with movements of the vehicle 108. Telematics data may also indicate which autonomous vehicle control feature are operating in the vehicle 108 as the vehicle 108 approaches or traverses an area. In some embodiments, the mobile device 110 or on-board computer 114 may be integrated into a single device, and in other embodiments, may be separate devices.

Similar to the controller 155 of FIG. 1, the controller 204 may include a program memory 208, one or more processors 210 (e.g., microcontrollers or microprocessors), a RAM 212, and the I/O circuit 216, all of which are interconnected via an address/data bus 214. The program memory 208 may include an operating system 226, a data storage 228, a plurality of software applications 230, and/or a plurality of software routines 240. The operating system 226, for example, may include one of a plurality of general purpose or mobile platforms, such as the Android™, iOS®, or Windows® operating systems. Alternatively, the operating system 226 may be a custom operating system designed for vehicle operation using the on-board computer 114. The data storage 228 may include data such as user profiles and preferences, application data for the plurality of applications 230, routine data for the plurality of routines 240, and other data related to road navigation and/or vehicle operation features. In some embodiments, the controller 204 may also include, or otherwise be communicatively connected to, other data storage mechanisms (not shown), such as hard disk drives, optical storage drives, or solid state storage devices located within the vehicle 108.

As discussed with reference to the controller 155, it should be appreciated that although FIG. 2 depicts only one processor 210, the controller 204 may include multiple processors 210. Processor 210 may be configured to execute any of one or more of the plurality of software applications 230 or any one or more of the plurality of software routines 240 residing in the program memory 208, in addition to other software applications. Similarly, the controller 204 may include multiple RAMs 212 and multiple program memories 208. RAM 212 and program memory 208 may be semiconductor memories, magnetically readable memories, or optically readable memories, for example.

As discussed with reference to the program memory 160 in FIG. 1, data storage 228 may store various software applications 230 implemented as machine-readable instructions, which may include a collision risk index mapping application 232 and an autonomous vehicle control feature engage/disengage application 234. The collision risk index mapping application 232 may determine and electronically map an area having a collision risk index onto a virtual navigation map or an alert. The autonomous vehicle control feature engage/disengage application 234 may generate or implement control commands to actually control various vehicle control features, such as steering, braking, or throttling of the vehicle 108, based upon the collision risk index. The generated control command may be communicated to the vehicle control components of the vehicle 108 to effect a control action. The various software applications may be executed by the same computer processor 210 or by different computer processors. The various software applications 230 may call various software routines 240, such as collision risk index mapping routine 242 and/or autonomous vehicle control feature engage/disengage application 244 to execute the various software applications 230.

Figure 3:
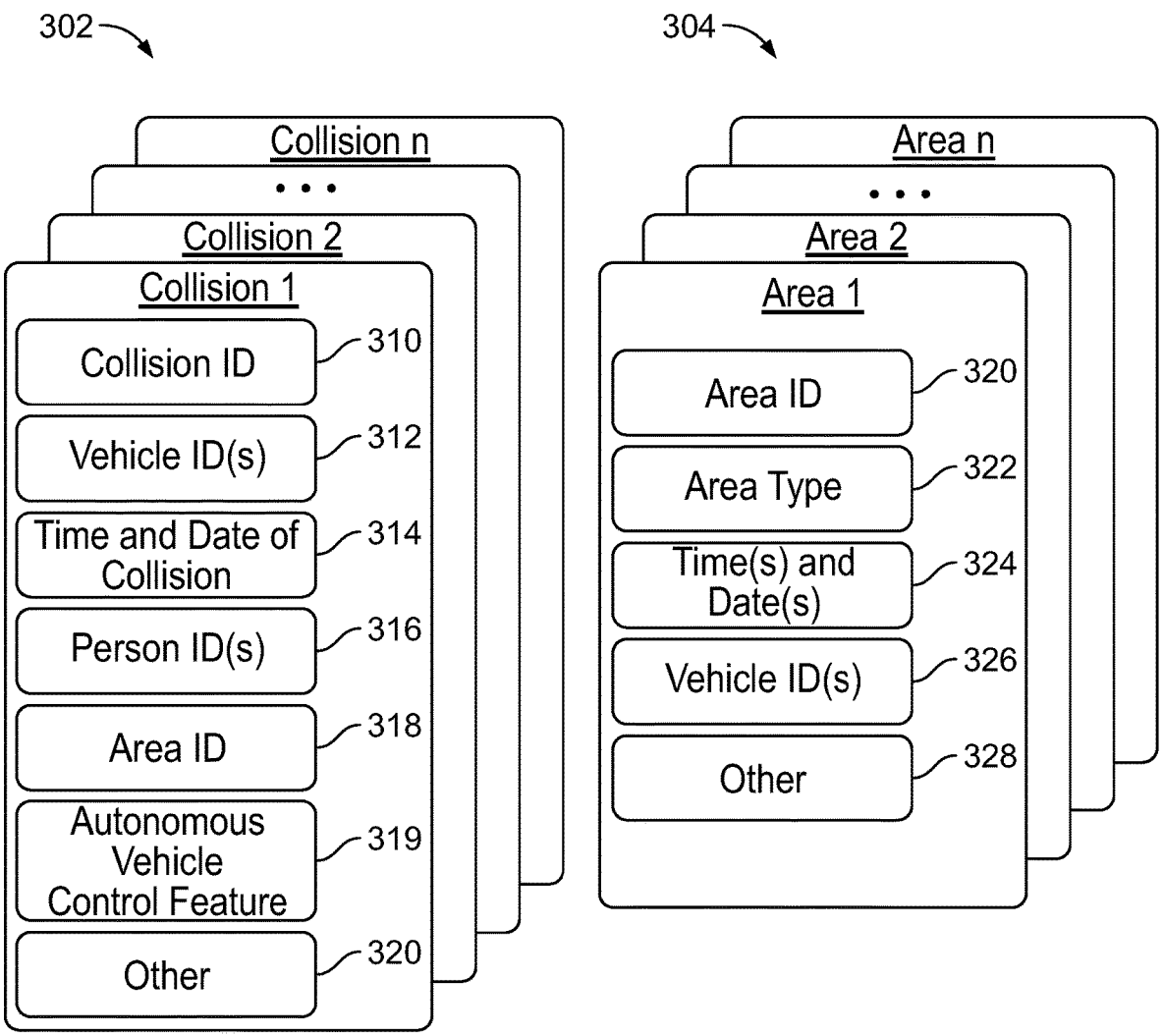
FIG. 3 illustrates exemplary historical traffic data according to one embodiment.
Figure 4:
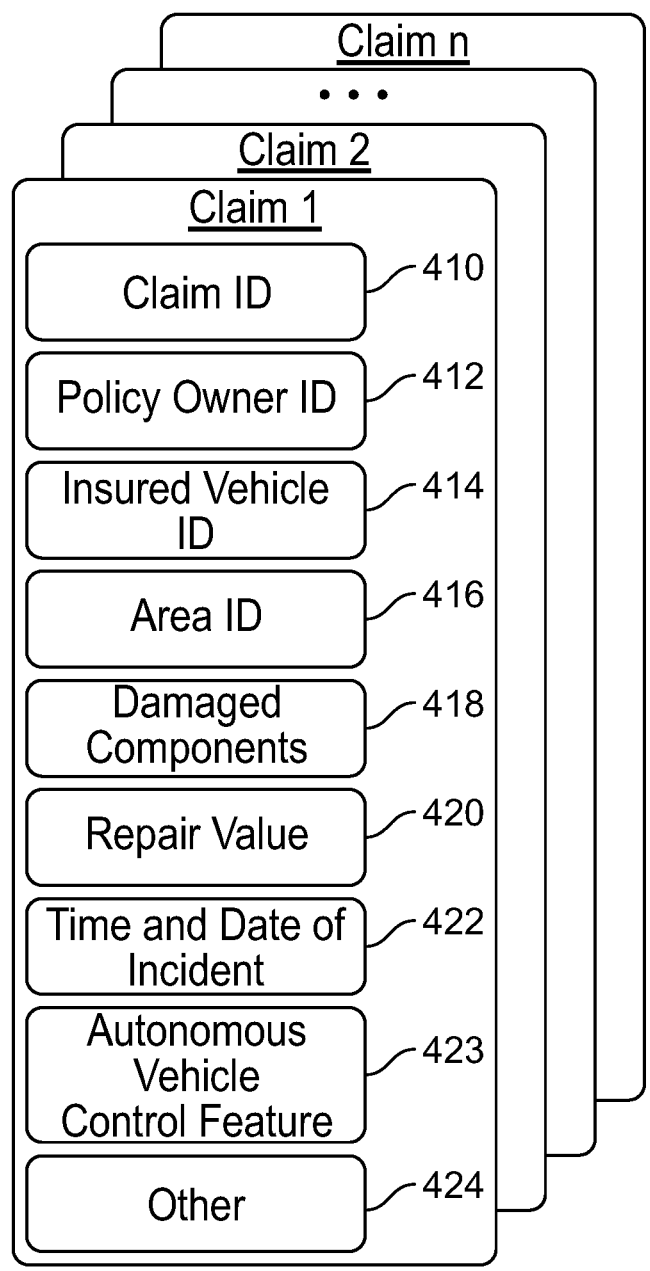
FIG. 4 illustrates exemplary claims data according to one embodiment.

In addition to applications and routines, the data storage 228 may store various data, such as expected collisions data 231, observed collisions data 233, collision risk index data 235, autonomous vehicle control feature data 237, and/or notification data 239. In one embodiment, the data storage 228 may include one or more of historical traffic data 252 and/or claims data 254. In other embodiments, historical traffic data 252 and/or claims data 254 may be stored in database 146 managed by server 140. Exemplary historical traffic data 252 is shown in FIG. 3. Exemplary claims data 254 is shown in FIG. 4.

Expected collisions data 231 represents an expected number of collisions. The expected collisions data 231 may include data representing a number of collisions that may be expected for any one or more of the following: a particular area of traffic (e.g., an intersection, street, portion of a street, parking lot, and the likes), a particular time, such as the time of year (e.g., a particular date, month, and/or season), a day of the week (e.g., Sunday-Saturday), a time of day (e.g., a particular time or a general time, such as "evening" or "morning"), a volume of traffic (e.g., a number of cars per hour), and the likes. In some embodiments, the processor 210 generates or collects some or all of the expected collisions data 231 based upon the historical traffic data 252 and/or the claims data 254 that are gathered from various sources, such as vehicle 108, sensors 120, and server 140. For example, claims data 254 may be associated with actual insurance claims arising from real world vehicle collisions, such as data scrubbed of personal information, or otherwise de-identified auto insurance claim data. Claims data 254 generally represents insurance claims filed by insurance policy owners. The claims data 254 may identify a particular collision, policy owners, involved vehicles, area location where the collision occurred, property involved, repair and/or replacement costs and/or estimates, a time and date of the collision, and/or various other information. In one embodiment, actual claim images (such as mobile device images of damaged vehicles, or images acquired via vehicle-mounted cameras and/or sensors) may be analyzed to associate an amount of physical damage shown in one or more images of vehicles involved in a vehicle collision with a repair or replacement cost of the vehicles. The actual claim images may be used to estimate repair or replacement cost for vehicles involved in past, recent, or current vehicle collisions. The processor 210 may then analyze the historical traffic data 252 and/or the claims data 254 to calculate a collision risk index for a particular area of traffic.

The system 200 may acquire historical traffic data 252 and/or the claims data 254 for a number of comparable areas near a potential hazardous area of interest. For each comparable area, the acquired historical traffic data 252 may include a number of collisions for a particular time period and/or a traffic volume. The processor 210 may calculate a "per vehicle" collision rate for each comparable area, and may rely on an average of these "per vehicle" collision rates to estimate the expected number of collisions for the potential hazardous area of interest (e.g., based upon the expected traffic volume of the area of interest). Accordingly, the processor 210 may calculate expected collisions for a particular area (shown in more detail in FIG. 5) and store the calculated expected collisions to the data storage 228 as expected collision data 231.

The processor 210 may then receive data identifying observed collisions from server 140 for the same area in which expected collisions were calculated. For example, in some embodiments, the processor 210 may transmit a query to server 140 managing the claims database 254 in order to receive data identifying observed collisions from server 140. The processor 210 or server 140 may identify from the claims data 254 collisions that occurred within the area of interest and within the particular time period. The number of identified collisions resulting from the query may be saved to the data storage 228 as observed collision data 233. Observed collisions data 233 may identify a total number of collisions that actually occurred at a certain area over a certain time period. In some embodiments, observed collisions data 233 may identify a total number of collisions, attributable to engaged or disengaged autonomous vehicle control features, that actually occurred at a certain area over a certain time period that is associated with vehicle damages above a certain threshold. For example, the processor 210 may transmit a query to server 140 managing the claims database 254 in order to receive data identifying observed collisions from server 140 associated with vehicle damages above $10,000. In some embodiments, observed collisions data 233 may identify a total number of collisions, attributable to engaged or disengaged autonomous vehicle control features, that actually occurred at a certain area over a certain time period that is associated with personal injuries above a certain threshold. For example, the processor 210 may transmit a query to server 140 managing the claims database 254 in order to receive data identifying observed collisions from server 140 associated with personal injuries above $20,000. In some embodiments, observed collisions data 233 may identify a total number of collisions, attributable to engaged or disengaged autonomous vehicle control features, that actually occurred at a certain area over a certain time period that is associated with vehicle repairs above a certain threshold. For example, the processor 210 may transmit a query to server 140 managing the claims database 254 in order to receive data identifying observed collisions from server 140 associated with personal injuries above $5,000. The aforementioned thresholds may be stored in program memory 160 or program memory 208.

In some embodiments, observed collisions data 233 data may be indicative of collisions involving policy holders associated with a particular insurance company, or may also be indicative of collisions involving policy holders and/or vehicles associated with multiple companies.

In some embodiments, observed collisions data 233 data may distinguish collisions in which certain autonomous (or semi-autonomous) vehicle control features were engaged from collisions in which certain autonomous (or semi-autonomous) vehicle control features were disengaged. Such statistics may be used to determine whether it is safer, as indicated by the collision risk index, for a vehicle approaching or traversing a hazardous area to engage or disengage certain autonomous vehicle control features. For example, observed collisions data 233 may indicate that vehicles involved in 90% of collisions at a certain intersection did not engage a particular autonomous vehicle control feature, which may indicate that it is safer for a vehicle approaching or traversing the intersection to engage the particular autonomous vehicle control feature. As another example, observed collisions data 233 may indicate that vehicles involved in 90% of collisions at a certain intersection involving traffic patterns that require the driver to multitask (e.g., focus on two or more of speed (accelerating or braking), changing lanes (merging with traffic, leaving one flow of traffic for another, signaling lanes changes, determining when to exit or what road to take), weather, traffic lights, traffic signs, and the likes), which may indicate that it is safer for a vehicle approaching or traversing the intersection to engage a particular autonomous vehicle control feature.

The observed collisions data 233 may also distinguish collisions in which certain autonomous vehicle control features were engaged when the vehicle was already traversing a hazardous area from collisions in which certain autonomous vehicle control features were engaged when the vehicle was approaching the hazardous area. For instance, the observed collisions data 233 may suggest that 90% of collisions at a certain intersection occurred when certain autonomous vehicle control features were engaged while the vehicle was already traversing a hazardous area, and 10% of collisions at the intersection occurred when certain autonomous vehicle control features were engaged a certain distance (e.g., one mile) or time (e.g., one minute) prior to the vehicle entering the hazardous area.

The processor 210 may next compare the expected collisions to the observed collisions to calculate the collision risk index to evaluate the riskiness of an area or areas. For example, in some embodiments, the processor 210 may divide the number of observed collisions by the number of expected collisions. The processor 210 may store the resulting quotient to the data storage 228 as collision risk index data 235 for the particular area. In such embodiments, a collision risk index value equal to one may suggest that an area is about as dangerous as expected; a collision risk index value greater than one may suggest that the area is more risky than expected; and a collision risk index value less than one may suggest that the area is less risky than expected. Accordingly, the collision risk index data 235 represents one or more collision risk indices calculated by the processor 210 after comparing the expected collisions to the observed collisions to calculate the collision risk index.

For example, in a hypothetical scenario, the expected collisions data 231 may indicate that 100 collisions were expected for the month of January 2014 at the intersection of Main Street and Broadway. Further, the observed collisions data 233 may indicate that 110 collisions were observed during the month of January 2014 at the intersection of Main Street and Broad. Thus, the processor 210 may calculate the collision risk index to be 110/100, or 1.1. A collision risk index of 1.1 may suggest that the intersection of Main Street and Broadway is riskier than expected.

Furthermore, in yet another hypothetical example, the expected collisions data 231 may indicate that 20 collisions were expected in the month of February at the intersection of Main Street and Broadway in the presence of snow and ice on the road. Further, the observed collisions data 233 may indicate that 40 collisions have so far been reported during the month of February when snow and ice have also been reported. Thus, the processor 210 may calculate the collision risk index to be 40/20, or 2.0 when snow and ice are present. A collision risk index of 2.0 may suggest that the intersection of Main Street and Broadway is riskier when snow and ice are present.

In some embodiments, the collision risk index may be calculated differently. For example, in some embodiments, the processor 210 may subtract the observed collisions from the expected collisions and may store the result as collision risk index data 235. In such embodiments, a value of 0 may suggest that an area is about as risky as expected, a positive value may suggest that an area is less risky than expected, and a negative value may suggest that the area is riskier than expected.

In some embodiments, the collision risk index may also reflect whether it is safer for a vehicle approaching or traversing the intersection to engage or disengage a particular autonomous vehicle control feature. For example, the value of the collision risk index may itself be increased or decreased if it is less safe or safer (e.g., more risky or less risky), respectively, for a vehicle approaching or traversing the intersection to engage or disengage a particular autonomous vehicle control feature. In another example, if the value of the collision risk index is expressed in two bits, an additional bit of a "1" or "0" may be upended to designate whether engaging or disengaging the particular autonomous vehicle control feature is safer. Similarly, the collision risk index may reflect a certain distance (e.g., one mile) or time (e.g., one minute) prior to the vehicle entering the hazardous area in which the particular autonomous vehicle control feature should be engaged, assuming it is safer to engage the particular autonomous vehicle control feature.

In some embodiments, the processor 210 may execute the autonomous vehicle control feature engage/disengage application 234 to generate or implement control commands to actually control various vehicle control features, such as steering, braking, or throttling of the vehicle 108, based upon the collision risk index, and store the control commands to the data storage 228 as autonomous vehicle control feature data 237.

In some embodiments, the processor 210 may execute a collision risk index mapping routine 242 to generate, for example, a virtual navigation map or alert to depict one or more collision risk indices for areas within a depicted region, by performing one or more of the following operations: (i) identifying a region; (ii) identifying one or more collision risk indices associated with areas within the region; and/or (iii) generating a virtual navigation map or alert that may include or is overlaid with elements (e.g., graphic, audible, haptic) depicting the identified collision risk indices along with the areas.

First, the processor 210 may identify a region. This may be responsive to user input received via one or more input devices coupled to the I/O 216. For example, a user may specify a particular zip code or city. In some embodiments, the user may specify a particular area (e.g., a landmark, intersection, building, parking lot, address, and the likes) and a radius.

Second, the processor 210 may identify one or more collision risk indices associated with areas within the region. For example, if the user specified a zip code of 60606, the processor 210 may identify collision risk indices associated with areas within zip code 60606.

Third, the processor 210 may generate a virtual navigation map or alert that may include or that is overlaid with elements corresponding to the identified collision risk indices. Each element may indicate a collision risk index associated with an area. For example, certain colors, shapes, or sizes of graphic elements may indicate risky or hazardous areas. An area with a high collision risk index may be encompassed by a large, red circle, for example, while an area with a low collision risk index may be encompassed by a smaller, blue circle. Various other shapes or symbols may be utilized to indicate collision risk indices (e.g., triangles, hexagons, exclamation points, and the likes). In some embodiments, graphic elements may be names that are, e.g., colored or sized to correlate to the collision risk index. For example, the graphic elements may be street names (e.g., "Broadway") or intersection names (e.g., "Broadway and Main").

In some embodiments, a graphic element may be a depiction of an area itself, colored or sized to correlated to the collision risk index. For example, if the intersection of Broadway and Main has a high collision risk index, the graphic element may be a depiction of Broadway and Main (e.g., graphics of the intersecting streets), colored red and/or enlarged, for example. If the intersection of Broadway and Main has a low collision risk index, the graphic element may be a depiction of Broadway and Main, colored blue and shrunk relative to a normal size, for example.

The processor 210 may store the virtual navigation map to the data storage 228 as notification data 239. In some embodiments, the processor 210 may display the virtual navigation map via the display 202. The virtual navigation map may be depicted as a heat map, using various colors, for example, to indicate different levels of collision risk. An example virtual navigation map is shown in FIG. 10.

A user may rely on the displayed virtual navigation map to evaluate the collision risk of various areas. For example, a driver or potential driver may rely on the virtual navigation map to choose less risky travel routes. In some instances, a civil engineer may rely on the virtual navigation map to identify areas that potentially need infrastructure improvement. For example, a high-collision risk area may need additional stop lights or street lights to reduce the number and/or severity of collisions at the area.

In another example operation, server 140 may (i) collect historical traffic data 252 and/or auto claim data 254 via wireless communication or data transmission over one or more radio links or wireless communication channels; (ii) determine hazardous areas from the historical traffic data 252 and/or auto claim data 254; and (iii) generate a notification to automatically engage or disengage an autonomous vehicle control feature for a vehicle that approaches hazardous areas. Subsequently, server 140 may transmit the hazardous area information and the notification to vehicle 108, mobile device 110, or wearable electronics of a user via wireless communication or data transmission over one or more radio links or wireless communication channels. In some embodiments, the server 140 may receive an indication as to whether the user or autonomous vehicle accepted the engaging or disengaging of the autonomous vehicle control feature, upon permission by the user or settings of the autonomous vehicle. In response, the server 140 may update or adjust an auto, personal, health, or other insurance premium or discount to reflect risk averse behavior.

FIG. 3 further illustrates example historical traffic data 252 that was described in FIG. 2, according to one embodiment. The historical traffic data 252 may include collision data 302 and/or area data 304, and may include historical or current auto insurance claim data.

The collision data 302 may include records for multiple collisions. For each collision, the collision data 302 may include a record of relevant information. Each collision record may include or reference one or more of: a collision identifier (ID) 310 unique to the collision; vehicle ID(s) 312 identifying the vehicle(s) involved in the collision; time and date data 312 identifying when the collision occurred; person ID(s) 316 identifying people involved in the collision (e.g., policy holders); an area ID 318 identifying an area of the collision; an autonomous vehicle control feature ID 319 identifying whether a certain autonomous vehicle control feature was engaged or disengaged, identifying the specific autonomous vehicle control feature that was engaged or disengaged, and/or identifying when the specific autonomous vehicle control feature that was engaged or disengaged; and/or other data 320. The system 200 may utilize the collision data 302, e.g., to identify a number of collisions for a particular area within a particular time period.

The area data 304 may include records for multiple areas. For each area, the area data 304 may include a record of relevant information. Each area record may include or reference one or more of: an area ID 320 unique to the area; an area type 322 identifying an area type (e.g., bridge, road, intersection, and the likes); times and/or dates 324 of observed traffic in the area; vehicle ID(s) 326 identifying vehicles observed in the area; and/or other data 328. The system 200 may utilize the area data 304 to, e.g., calculate a traffic volume for a given area for a time period (e.g., over a week, month, year, and the likes).

FIG. 4 further illustrates example claims data 254 according to one embodiment.

The claims data 254 may include records for multiple insurance claims filed by policy holders. For each claim, the claims data 254 may include a record of relevant information. Each claim record may include or reference one or more of: a claim ID 410 unique to the claim; a policy owner ID 412 unique to the policy holder who filed the claim; a vehicle ID 414 unique to the vehicle owned by the policy holder; an area ID 416 unique to the area where the incident or collision occurred; damaged components data 418 identifying the property damage resulting from the incident or property; a repair or replacement value 420 describing the costs associated with repairing or replacing the damaged components; time and date information 422 unique to the time when the incident or collision occurred; an autonomous vehicle control feature ID 423 identifying whether a certain autonomous vehicle control feature was engaged or disengaged, identifying the specific autonomous vehicle control feature that was engaged or disengaged, and/or identifying when the specific autonomous vehicle control feature that was engaged or disengaged; and/or other information 424, such as data indicating a number and extent of personal injuries resulting from a vehicle collision and/or data indicating an extent of liability damages resulting from a vehicle collision. The system 200 may analyze the claims data 254 to identify a number of collisions involving policy holders for a particular area within a particular time period. The system 200 may compare this number of collisions to a market-adjusted expected collisions number, enabling a calculation of a collision risk index particular to a particular market (e.g., to identify a collision risk index for an area specific to customers of a particular insurance company, or to identify a collision risk index for an area specific to vehicles of a particular make and/or model).

Figure 5:
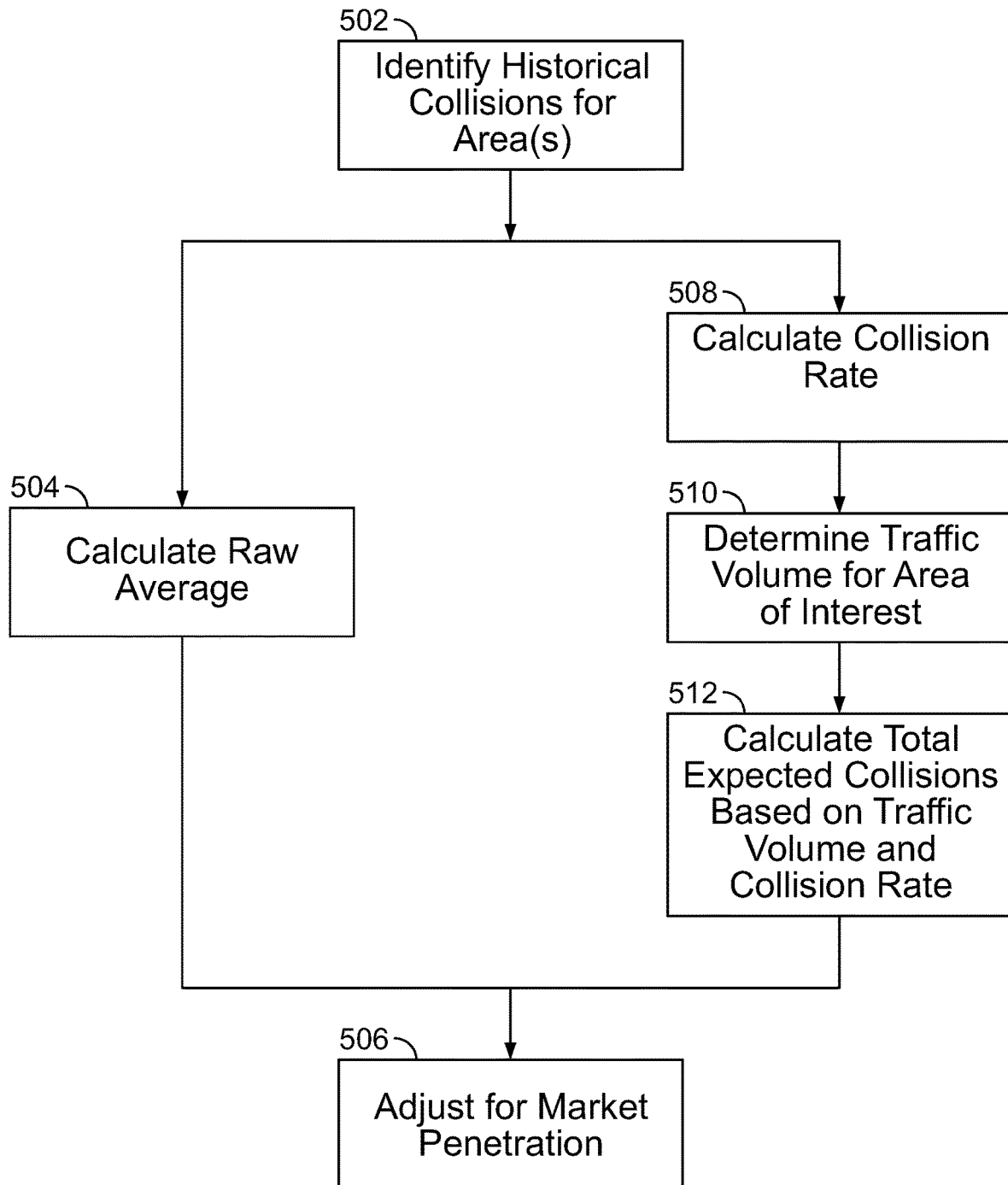
FIG. 5 illustrates an exemplary flowchart for calculating expected collisions according to one embodiment.

FIG. 5 illustrates a computer-implemented method 500 for calculating expected collisions according to one embodiment. The method 500 may be implemented, in whole or in part, by the computer system 200 shown in FIG. 2. The method 500 may be stored to memory as one or more instructions or routines.

The method 500 may begin when historical collisions are identified for a particular area or areas (block 502). In one embodiment, historical collisions are identified for the area of interest. For example, historical traffic data 252 may identify all historical collisions that have occurred at the area of interest. In one embodiment, the system 200 may identify historical collisions that occurred in recent history (e.g., in the last month, the last few months, the last year, the last few years, and the likes). The system 200 may then identify an average number of collisions for a time period corresponding to a time period of interest (e.g., a week, month, and the likes). As an example, the system 200 may rely on the last five years of data to calculate the average number of collisions per month for the area of interest.

In one embodiment, historical collisions at areas near the area of interest may be identified. For example, a first and second area near the area of interest may be identified and used to calculate the expected collisions. Data for the first and second area of interest may be used in addition to, or in place of, data for the area of interest, depending on the embodiment. There may not be any data for some areas of interest, and thus data from multiple areas near the area of interest may be used instead. By utilizing data from multiple areas within a region, the system 200 may obtain an expected collisions value that represents a regional average. Thus, when observed collisions are eventually compared to the expected collisions to obtain a collision risk index, the system 200 may determine which areas are more or less risky than might be expected for the region.

In one embodiment, a raw average number of expected collisions may be calculated based upon the identified historical collisions (block 504). For example, the first area near the area of interest may have 10 collisions per month over the last five years, the second area near the area of interest may have 20 collisions per month over the last five years, and the actual area of interest may have six collisions per month over the last five years. The raw average number of expected collisions for the region including the first area, the second area, and the area of interest would be 12 collisions per month. This raw average may be used as the expected total collisions value for the total area encompassing the area of interest and the first and second areas. In other embodiments, the raw average number of expected collisions may be tailored to other subsets of the total area, such as the first and second areas only.

In one embodiment, after historical collisions are identified for the area(s) (block 502), traffic volume is identified for each of the areas in order to calculate a collision rate for each area (block 508). For example, if the first area has an average traffic volume of 100 vehicles per month, the collision rate for the first area would be 10 collisions per 100 vehicles. If the second area has an average traffic volume of 500 vehicles per month, the collision rate for the second area would be 20 collisions per 500 vehicles, or equivalently, four collisions per 100 vehicles. Thus, despite having more collisions per month, the second area would have a lower collision rate for a given traffic volume. As another example, if the area of interest has an average traffic volume of 200 vehicles per month, the collision rate for the area of interest would be six collisions per 200 vehicles, or equivalently, three collisions per 100 vehicles.

An average collision rate may be calculated for the region encompassing each of the areas described above. For example, the average collision rate for the first area, second area, and area of interest would be 5.6 collisions per 100 vehicles ((10+4+3)/3=5.6).

A traffic volume may be determined for the area of interest (block 510). The traffic volume may be determined by analyzing the historical traffic data 252. For example, the area of interest may have a traffic volume of 200 vehicles per month.

The total expected collisions for the area of interest may be calculated based upon the determined traffic volume and the collision rate (block 512). For example, if the area of interest has a traffic volume of 200 vehicles per month and the calculated collision rate is 5.6 collisions per 100 vehicles, the total expected collisions for the area of interest during a given month would be 11.2 collisions. Similarly, if the first area has a traffic volume of 100 vehicles per month and the calculated collision rate is 5.6 collisions per 100 vehicles, the total expected collisions for the first area during a given month would be 5.6 collisions. Although the average collision rate of 5.6 collisions per 100 vehicles was used, the collision rate for a particular area may be used in other embodiments. For example, the total expected collisions for the first area during a given month may be calculated by using the collision rate for the first area (i.e., 10 collisions per 100 vehicles as calculated above) rather than the average collision rate of 5.6 collisions per 100 vehicles.

In some embodiments, the system 200 may adjust the total expected collisions for market penetration (block 506). For example, an insurance company may be interested in calculating the expected collisions for the area involving vehicles owned by policy holders. In some embodiments, the system 200 may make this calculation using a market penetration value, which represents a percentage of the total market. For example, an insurance company with 30% market penetration insures an estimated 30% of the cars on the road for an area of interest. In some embodiments, the system 200 may calculate the market penetration by analyzing the claims data 254 to determine how many policy holder vehicles exist in a given area and by analyzing the historical traffic data 252 to determine a total number of vehicles active in the area. The system 200 may then multiply the resulting market penetration value by the total expected collisions for the area to obtain a market adjusted expected collisions value. For example, given 30% market penetration and a total expected collisions value of 11.2, the market adjusted expected collisions value would be 3.36.

Figure 6:
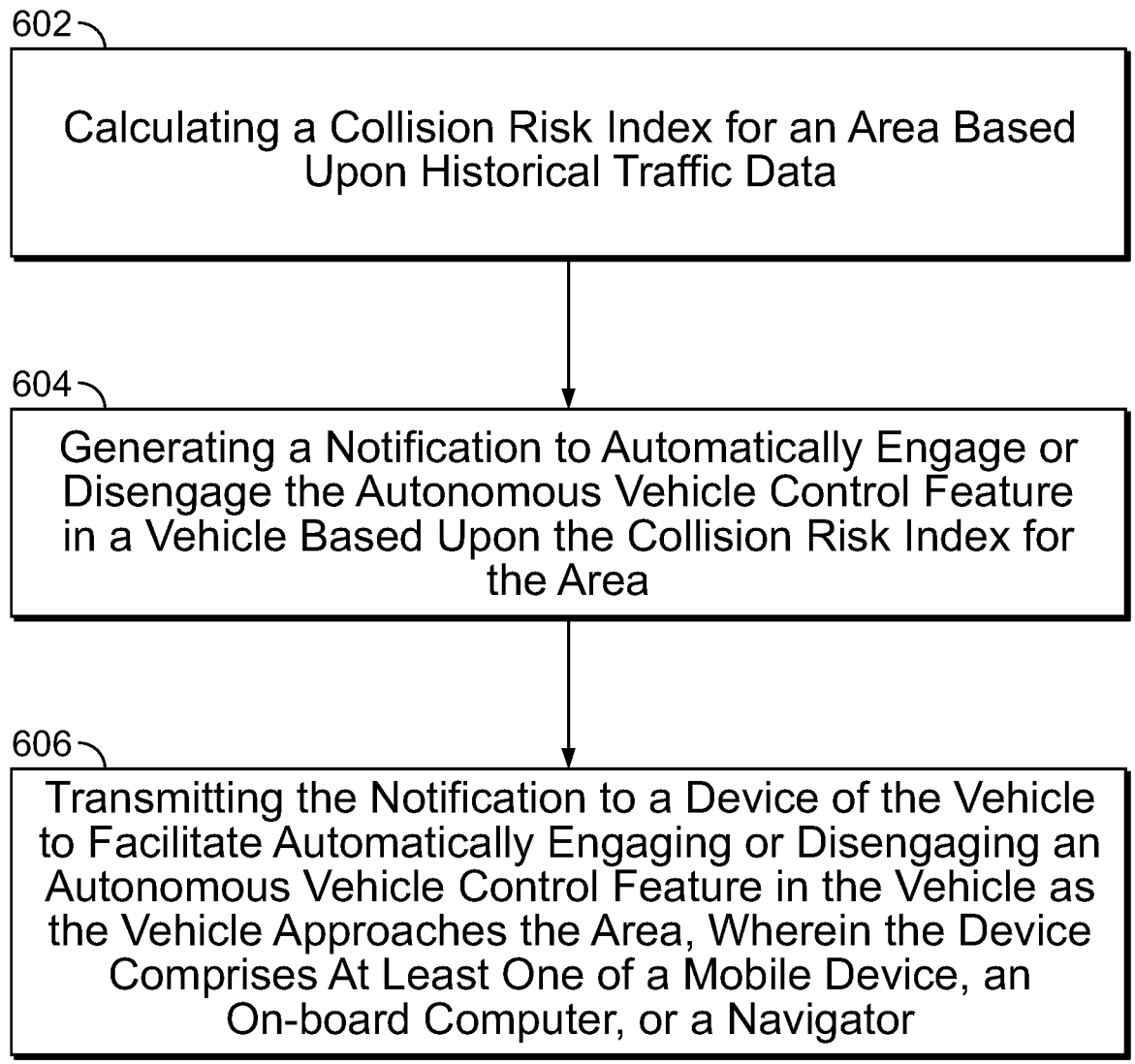
FIG. 6 illustrates an exemplary flowchart for collision risk-based engagement and disengagement of autonomous control of a vehicle according to one embodiment.

FIG. 6 illustrates a computer-implemented method 600 for collision risk-based engagement and disengagement of autonomous control of a vehicle according to one embodiment. The method 600 may be implemented, in whole or in part, by the systems 100 or 200 shown in FIGS. 1 and 2, implemented via one or more processors (e.g., processor 210 or processor 162), transceivers, and/or sensors 120, and/or via computer-executable instructions stored on non-transitory computer-readable medium or media. Accordingly, in some embodiments, server 140 having access to historical traffic data 252 and/or claims data 254 may carry out the method. In other embodiments, on-board computer 114 or mobile device 110 having memory that stores historical traffic data 252 and/or claims data 254 may carry out the method. In other embodiments, on-board computer 114 or mobile device 110 may retrieve historical traffic data 252 and/or claims data 254 from server 140 and subsequently carry out the method. The method 600 may be stored in memory (e.g., program memory 208) or a database (e.g., database 146) as one or more instructions or routines.

The method 600 may begin by calculating a collision risk index for an area based upon historical traffic data (block 602). As described above, calculating the collision risk index may include any one or more of: (i) calculating a number of expected collisions in an area over a time period; (ii) determining a number of observed collisions in the area over the time period; and (iii) calculating the collision risk index based upon a comparison between the number of expected collisions and the number of observed collisions.

Specifically, the number of expected collisions may be calculated based upon historical traffic data 252. In one embodiment, historical traffic data 252 for a particular area of interest may be analyzed, and an average number of collisions may be calculated and used for the expected collisions. For example, historically, a particular area may average 10 collisions per month. Thus, the number of expected collisions for the particular area may be 10 collisions per month. In some embodiments, historical traffic data for multiple areas may be analyzed, and the average number of collisions may be calculated for all of the areas and used for the expected collisions. For example, historically, five different areas (including the particular area described above) within a region may average a total of 62 collisions per month. Thus, the number of expected collisions for any given area within the region (e.g., including the particular area) may be 12.4 collisions per month. Although an average number of collisions are used for the expected collisions, other statistical measures are envisioned, such as determining the mode or median for the historical traffic data to calculate the expected collisions.

In some embodiments, the number of expected collisions may be a function of traffic volume. For example, a collision rate may be represented by the number of collisions per 100 vehicles of traffic based upon historical traffic data for a single area or for multiple areas (e.g., 5.5 collisions per 100 vehicles of traffic). Accordingly, when a traffic volume for the area of interest independent of any collisions is observed (e.g., 200 vehicles per month), then the number of expected collisions for the area of interest may be calculated (e.g., the area of interest may expect 11 collisions per month per 200 vehicles of traffic).

In one embodiment, the number of expected collisions may be adjusted for market penetration. Using the expected 11 collisions per month per 200 vehicles of traffic as an example, if an insurance company has 25% market penetration, the insurance company may calculate an expected collisions value of 2.75 (i.e., 25% of 11) collisions per month per 200 vehicles of traffic, representing the expected number of collisions that involve vehicles insured by the insurance company. As another example, a vehicle manufacturer may adjust for market penetration to identify an expected number of collisions that involve vehicles of a particular make and/or model.

A number of observed collisions in the same area for which expected collisions were calculated, over the same time period, may then be determined. Claims data 254, for instance, may be utilized to identify the number of actual collisions observed at the area. For example, an analysis of claims data 254 may reveal that insurance claims have been filed on 15 collisions that have occurred at the area of interest described above over the course of a month. When compared to the expected collision value of 11 calculated in the example above, the area of interest experienced more collisions (i.e., 4 more collisions) than expected.

In some embodiments, only a subset of the number of actual collisions observed at the area may be determined. For example, an analysis of claims data 254 may reveal that insurance claims have been filed on 15 collisions that have occurred at the area of interest described above over the course of a month, but only 10 of the 15 collisions are associated with vehicle damages above a predetermined threshold, such as $10,000, and attributable to engaged or disengaged autonomous vehicle control features. When comparing the 10 actual collisions observed associated with vehicle damages above a predetermined threshold, such as $10,000, to the expected collision value of 11 calculated in the example above, the area of interest experienced less collisions (i.e., 1 less collision) than expected.

As another example, an analysis of claims data 254 may reveal that insurance claims have been filed on 15 collisions that have occurred at the area of interest described above over the course of a month, but only 12 of the 15 collisions are associated with personal injuries above a predetermined threshold, such as $20,000, and attributable to engaged or disengaged autonomous vehicle control features. When comparing the 12 actual collisions observed associated with personal injuries above a predetermined threshold, such as $10,000, to the expected collision value of 11 calculated in the example above, the area of interest experienced more collisions (i.e., 1 more collision) than expected.

As another example, an analysis of claims data 254 may reveal that insurance claims have been filed on 15 collisions that have occurred at the area of interest described above over the course of a month, but only 9 of the 15 collisions are associated with vehicle repairs above a predetermined threshold, such as $5,000, and attributable to engaged or disengaged autonomous vehicle control features. When comparing the 9 actual collisions observed associated with vehicle repairs above a predetermined threshold, such as $5,000, to the expected collision value of 11 calculated in the example above, the area of interest experienced less collisions (i.e., 2 less collisions) than expected.

A collision risk index for the area based upon a comparison between the number of expected collisions and the number of observed collisions may then be determined. For example, the number of observed collisions may be divided by the number of expected collisions, where a collision risk index value greater than one indicates that the area is riskier than expected, and a collision risk index value less than one indicates that the area is less risky than expected. Using the numbers from the example above, the area of interest may be determined to have a collision risk index value of 1.36 (i.e., the result of 15/11). A collision risk index value for the area of interest using a subset of observed collisions may be similarly calculated.

Method 600 proceeds by generating a notification to automatically engage or disengage the autonomous vehicle control feature in a vehicle based upon the collision risk index for the area (block 604). Method 600 may then transmit the notification to a device (e.g., mobile device, an on-board computer, wearable electronics including an augmented reality appliance, or a navigator) of the vehicle to facilitate automatically engaging or disengaging an autonomous vehicle control feature in the vehicle as the vehicle approaches the area (block 606). In some embodiments, the notification may facilitate automatically engaging or disengaging an autonomous vehicle control feature in the vehicle when the vehicle is already traversing the area. In some embodiments, the notification may indicate which autonomous vehicle control feature to engage or disengage depending on whether it is safer for a vehicle approaching or traversing a hazardous area to engage or disengage the autonomous vehicle control feature. In some embodiments, the notification may indicate when to engage the autonomous vehicle control feature (e.g., a certain distance or time prior to the vehicle entering the hazardous area).

Figure 7:
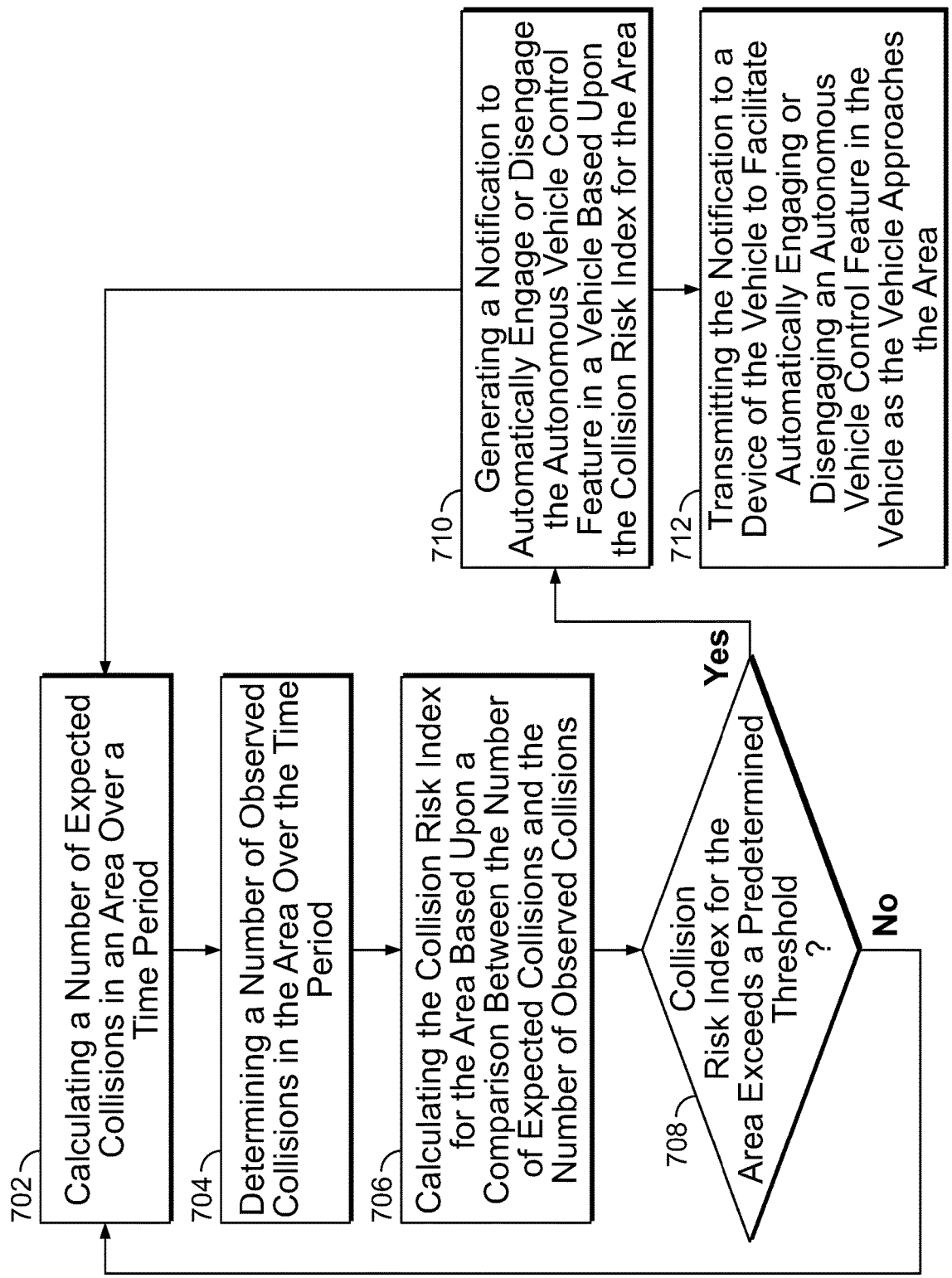
FIG. 7 illustrates an exemplary flowchart for collision risk-based engagement and disengagement of autonomous control of a vehicle according to another embodiment.

FIG. 7 illustrates a computer-implemented method 700 for collision risk-based engagement and disengagement of autonomous control of a vehicle according to another embodiment. The method 700 may be implemented, in whole or in part, by the systems 100 or 200 shown in FIGS. 1 and 2, implemented via one or more processors (e.g., processor 210 or processor 162), transceivers, and/or sensors 120, and/or via computer-executable instructions stored on non-transitory computer-readable medium or media.

Method 700 may begin by calculating a number of expected collisions in an area over a time period (block 702), determining a number of observed collisions in the area over the time period (block 704), and then calculate a collision risk index for the area based upon a comparison between the number of expected collisions and the number of observed collisions (block 706).

Method 700 may then determine whether the collision risk index for the area exceeds a predetermined threshold (block 708). For instance, by comparing the collision risk index to a predetermined threshold stored in memory (e.g., data storage 228, RAM 164) or database 146, processor 162 or 210 may determine that the collision risk index for the area exceeds a predetermined threshold. For example, using the numbers from the example above, a collision risk index of 1.36 would exceed a predetermined threshold of 1, which may be stored in program memory 160 of server 140 or data storage 228 of either mobile device 110 or on-board computer 114. As a result, processor 162 or 210 may classify the area associated with collision risk index of 1.36 as hazardous. Such a determination may be used as a criteria when generating a notification to automatically engage or disengage the autonomous vehicle control feature in a vehicle based upon the collision risk index for the area exceeding the predetermined threshold (block 710). If processor 162 or 210 determines that the collision risk index for the area does not exceed a predetermined threshold, method 700 may proceed to block 702, effectively disregarding a non-hazardous area.

The hazardous area may further be classified by type of vehicle damage, cost of vehicle repairs, number of injuries, cost of medical expenses, whether pedestrians or bicyclists were involved, location, type of road (such as intersection, circular traffic pattern, on-ramp, off-ramp, merging traffic from right or left, corner, parking lot with high levels of theft, road construction, daily changing traffic flow, narrowing number of lanes (such as 5 lanes becoming 4 or even 3 lanes leading to traffic backups), the temporary occurrence of inclement weather that contributes to suboptimal road surface conditions and the likes). The hazardous area may be a high-collision risk intersection at an above-average risk of vehicle collision, a high-collision risk portion of a road that is associated with an above-average risk of vehicle collision, a high-collision risk parking lot that is associated with an above-average risk of theft or vehicle collision, a high-collision risk portion of a road that is associated with a circular traffic pattern, and/or other hazardous areas, including those discussed elsewhere herein. The hazardous areas may be defined, at least in part, by GPS location or GPS coordinates. The hazardous areas may be characterized as to why they are high-collision risk. For example, certain intersections or portions of roads may be associated with a higher-than-average number of vehicle, bicycle, and/or pedestrian collisions, a higher amount of traffic, a large amount of road construction, abnormal traffic patterns, auto insurance claims including more serious vehicle damage or pedestrian and passenger damages, etc. Other hazardous areas may be associated with parking lots that have an abnormally high amount of vehicle collisions and/or vehicle theft.

Subsequent to block 710, method 700 may then transmit the notification to a device (e.g., mobile device 110, an on-board computer 114, wearable electronics including an augmented reality appliance, or a navigator) associated with a vehicle, operator or passenger of a vehicle, pedestrian, bicyclist, and the likes to facilitate automatically engaging or disengaging an autonomous vehicle control feature in the vehicle as the vehicle approaches the area, via wireless communication or data transmission over one or more radio links or wireless communication channels (block 712).

Although not shown, the method 700 may include receiving, via one or more processors (e.g., processor 210 or processor 162), transceivers, and/or sensors 120, and via wireless communication or data transmission over one or more radio frequency links or wireless communication channels, an indication that the vehicle automatically engaged or disengaged an autonomous vehicle control feature as the vehicle approached the hazardous area. An example of such an indication may be telematics data from the vehicle 108 indicating engagement or disengagement of the autonomous vehicle control feature.

Although not shown, the method 700 may further include building a virtual log of data indicating engagement or disengagement of the autonomous vehicle control feature based upon the indication. The virtual log may include telematics data taken by the vehicle, and how often the vehicle engages or disengages an autonomous vehicle control feature. The virtual log may be transmitted to an insurance provider remote server (e.g. server 140). The insurance provider remote server may generate or update an auto insurance premium or discount based upon the customer vehicle engaging or disengaging an autonomous vehicle control feature. For instance, vehicle owners that display risk averse driving behavior and avoid hazardous areas, or choose an alternative, less risk-prone mode of travel may be rewarded with lower premiums or higher discounts on auto or other types of insurance. Subsequently, the insurance provider remote server may transmit adjusted auto insurance premium or discounts to a mobile device 110 to incentivize safer vehicle operation. The method 700 may include additional, less, or alternate functionality, including that discussed elsewhere herein.

Figure 8:
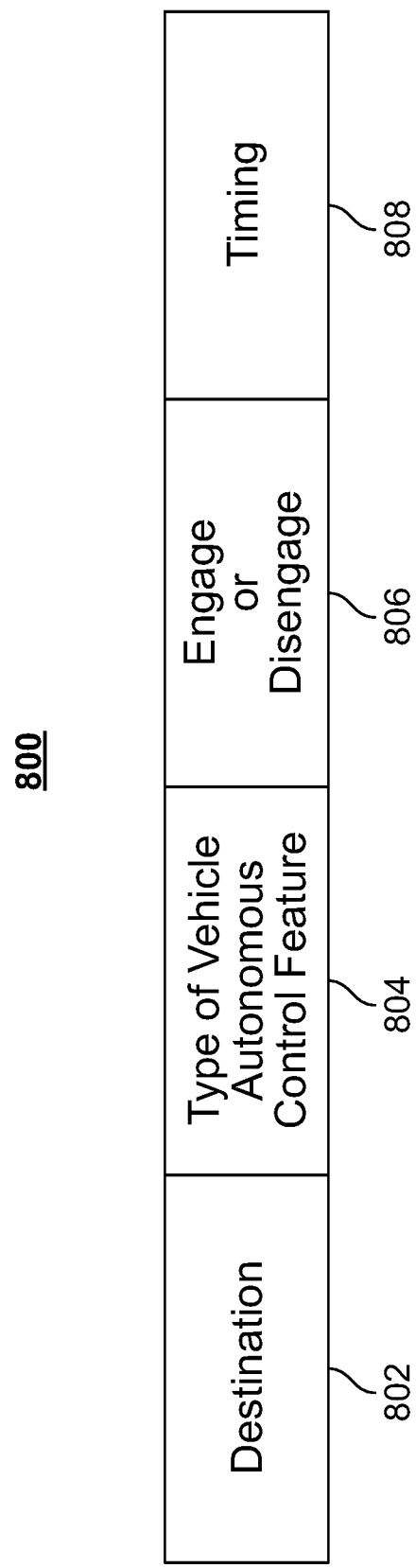
FIG. 8 illustrates an exemplary notification for collision risk-based engagement and disengagement of autonomous control of a vehicle according to one embodiment.

FIG. 8 illustrates a notification 800 according to one embodiment. The notification 800 may be generated by autonomous vehicle control feature engage/disengage application 144 as shown in FIG. 1, based upon the collision risk index. The notification 800 may include a destination indicator 802, such as on-board computer 114 or mobile device 110, so that the notification 800 is transmitted to the intended device. The notification 800 may include the particular type of autonomous vehicle control feature indicator 804 to identify the autonomous vehicle control feature to engage or disengage, such as steering, braking, or throttling of the vehicle 108. The notification 800 may include an engage or disengage indicator 806 to identify whether to engage or disengage the autonomous vehicle control feature. The notification 800 may also include a timing indicator 808 to control when the autonomous vehicle control feature engages or disengages, such as when the vehicle 108 is at a certain distance (e.g., one mile) or time (e.g., one minute) prior to the vehicle entering the hazardous area. The notification 800 may include additional, less, or alternate indicators.

One or more applications at the on-board computer 114 or mobile device 110 identified by the destination indicator 802 may receive the notification 800 to generate or implement control commands to actually control the autonomous vehicle control feature identified by the particular type of autonomous vehicle control feature indicator 804. One or more applications will then engage or disengage the identified autonomous vehicle control feature at a certain time based upon the engage or disengage indicator 806 and timing indicator 808, respectively. The control commands generated by the one or more applications may then be communicated to the vehicle control components of the vehicle 108 to effect a control action.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as vehicle location, time of day, type of vehicle collision, type of vehicle damage or personal injury, vehicle collision location, amount of vehicle damage or medical expenses associated with a vehicle collision, engaged autonomous vehicle control features, disengaged autonomous vehicle control features, or other such variables that influence the collision risks associated with vehicle collisions or vehicle travel.

Some embodiments described herein may include automated machine learning to determine hazardous areas, determine collision risk levels of the hazardous areas, identify relevant collision risk factors of the hazardous areas, automatically engage or disengage autonomous vehicle control features, determine which autonomous features should be preferably engaged or disengaged, optimize vehicle, bicycle, or pedestrian routes to avoid hazardous areas, generate or update electronic or virtual navigation maps, generate alerts to vehicles, drivers, bikers, or pedestrians, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element (e.g., mobile device 110, on-board computer 114, and/or server 104 of FIGS. 1 and 2) may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as vehicle collisions being caused by the same thing repeatedly occurring at one or more hazardous areas or location), in order to facilitate making predictions. Models may be created based upon example inputs of data in order to make valid and reliable predictions for novel inputs.

Additionally or alternatively, the machine learning programs may be trained by inputting sample data sets or certain data into the programs, such as mobile device, vehicle, or smart infrastructure sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with vehicle-mounted, home-mounted, and/or mobile device-mounted sensor data to identify certain customer activity, such as routine travel through one or more hazardous areas at certain times of day to determine whether a given type of vehicle collision (e.g., collision causing vehicle damage of a predetermined amount, or causing one or more pedestrian injuries) may be more likely than normal at a specific location, and/or monitoring vehicle behavior as the vehicle travels through the hazardous area, whether under self-control or manual control.

After training, machine learning programs (or information generated by such machine learning programs) may be used to evaluate additional data. Such training data may be related to past and/or historical vehicle collisions or near collisions gathered by smart vehicles, mobile device, or smart infrastructure, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such new or additional data may be related to current, up-to-date, or real-time vehicle collisions or near collisions gathered by smart vehicles, mobile device, smart infrastructure, or other sensors and cameras, or other similar data to be analyzed or processed. Such trained machine learning programs may, thus, be used to perform part or all of the analytical functions of the methods described elsewhere herein.

All of the foregoing methods discussed herein may be include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing devices and systems may also include additional, less, or alternate functionality, including that discussed elsewhere herein.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. Finally, unless a claim element is defined by reciting the word "means" and a function without the recital of any structure, it is not intended that the scope of any claim element be interpreted based upon the application of 35 U.S.C. § 112(f). The patent claims at the end of this patent application are not intended to be construed under 35 U.S.C. § 112(f) unless traditional means-plus-function language is expressly recited, such as "means for" or "step for" language being explicitly recited in the claim(s).

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method, carried out by a server, of reducing vehicle collisions, the method comprising:
    calculating, by one or more processors of the server, a collision risk index for an area, wherein the collision risk index is a comparison result between a number of calculated collision expectations in the area over a time period and a number of determined collision observations in the area over the time period;
    generating, by the one or more processors of the server, a notification to automatically engage or disengage an autonomous vehicle control feature in a vehicle based upon the collision risk index for the area; and
    transmitting, via a transceiver of the server, the notification to a device of the vehicle to facilitate automatically engaging or disengaging the autonomous vehicle control feature in the vehicle as the vehicle approaches the area,
    wherein:
    the device comprises at least one of a mobile device, an on-board computer, or a navigator,
    the one or more autonomous vehicle control features includes any of autonomous steering control, autonomous throttle control, or autonomous braking control, and
    the notification further comprises at least one of: (i) a virtual navigation map configured to be displayed depicting the collision risk index visually, (ii) an audible alert, (iii) a visual alert, or (iv) a haptic alert.

2. The method of claim 1, further comprising:
    determining, by the one or more processors, that the collision risk index for the area exceeds a predetermined threshold;
    wherein the generating of the notification is based on the collision risk index exceeding the predetermined threshold.

3. The method of claim 1, wherein the number of observed collisions in the area over the time period is associated with at least one of:
vehicle damages above a first predetermined threshold;
personal injuries above a second predetermined threshold; or
vehicle repairs above a third predetermined threshold.

4. The method of claim 1, wherein the generating of the notification to automatically engage or disengage the autonomous vehicle control feature is further based upon:
determining, by the one or more processors, whether the autonomous vehicle control feature was engaged or disengaged in the vehicle or other vehicles in the area based upon historical traffic data.

5. The method of claim 1, further comprising:
receiving, via the transceiver, an indication that the vehicle engaged or disengaged the autonomous vehicle control feature as the vehicle approached the area and;
adjusting, by the one or more processors, an insurance premium in response to the indication.

6. A server configured to reduce vehicle collisions, the server comprising:
a memory configured to store non-transitory computer executable instructions;
a processor configured to interface with the memory, wherein the processor is configured to execute the non-transitory computer executable instructions to cause the processor to:
calculate a collision risk index for an area, wherein the collision risk index is a comparison result between a number of calculated collision expectations in the area over a time period and a number of determined collision observations in the area over the time period, and
generate a notification to automatically engage or disengage an autonomous vehicle control feature in a vehicle based upon the collision risk index for the area; and
a transceiver configured to interface with the processor and communicate via a wireless network connection, wherein:
the transceiver is configured to transmit the notification to a device of the vehicle to facilitate automatically engaging or disengaging the autonomous vehicle control feature in the vehicle as the vehicle approaches the area,
the device comprises at least one of a mobile device, an on-board computer or a navigator,
the one or more autonomous vehicle control features includes any of autonomous steering control, autonomous throttle control, or autonomous braking control, and
the notification further comprises at least one of: (i) a virtual navigation map configured to be displayed depicting the collision risk index visually, (ii) an audible alert, (iii) a visual alert, or (iv) a haptic alert.

7. The server of claim 6, wherein the processor is further configured to:
determine that the collision risk index for the area exceeds a predetermined threshold; and
wherein the processor is configured to generate the notification based upon the collision risk index exceeding the predetermined threshold.

8. The server of claim 6, wherein the number of observed collisions in the area over the time period is associated with at least one of:
vehicle damages above a first predetermined threshold;
personal injuries above a second predetermined threshold; or
vehicle repairs above a third predetermined threshold.

9. The server of claim 6, wherein the processor is configured to generate the notification based upon determining whether the autonomous vehicle control feature was engaged or disengaged in the vehicle or other vehicles in the area based upon historical traffic data.

10. The server of claim 6, wherein the transceiver is configured to receive an indication that the vehicle engaged or disengaged the autonomous vehicle control feature as the vehicle approached the area; and
wherein the processor is configured to adjust an insurance premium in response to the indication.

11. A non-transitory computer readable medium containing a set of computer readable instructions for reducing vehicle collisions that when executed by a server configure the server to:
calculate, by the processor of the server, a collision risk index for an area, wherein the collision risk index is a comparison result between a number of calculated collision expectations in the area over a time period and a number of determined collision observations in the area over the time period;
generate, by the processor of the server, a notification to automatically engage or disengage an autonomous vehicle control feature in a vehicle based upon the collision risk index for the area; and
transmit, by a transceiver of the server, the notification to a device of the vehicle to facilitate automatically engaging or disengaging the autonomous vehicle control feature in the vehicle as the vehicle approaches the area,
wherein:
the device comprises at least one of a mobile device, an on-board computer, or a navigator,
the one or more autonomous vehicle control features includes any of autonomous steering control, autonomous throttle control, or autonomous braking control, and
the notification further comprises at least one of: (i) a virtual navigation map configured to be displayed depicting the collision risk index visually, (ii) an audible alert, (iii) a visual alert, or (iv) a haptic alert.

12. The non-transitory computer readable medium of claim 11, wherein the processor is further configured to:
determine that the collision risk index for the area exceeds a predetermined threshold; and
wherein the processor is configured to generate the notification based upon the collision risk index exceeding the predetermined threshold.

13. The non-transitory computer readable medium of claim 11, wherein the number of observed collisions in the area over the time period is associated with at least one of:
vehicle damages above a first predetermined threshold;
personal injuries above a second predetermined threshold; or
vehicle repairs above a third predetermined threshold.

14. The non-transitory computer readable medium of claim 11, wherein the processor is configured to generate the notification based upon determining whether the autonomous vehicle control feature was engaged or disengaged in the vehicle or other vehicles in the area based upon historical traffic data.

15. The non-transitory computer readable medium of claim 11, wherein the transceiver is configured to receive an indication that the vehicle engaged or disengaged the autonomous vehicle control feature as the vehicle approached the area; and wherein the processor is configured to adjust an insurance premium in response to the indication.

\* \* \* \* \*